US005296164A

United States Patent [19]

Thach et al.

[11] Patent Number: 5,296,164

[45] Date of Patent: Mar. 22, 1994

[54] HIGH-STABILITY FOAMS FOR LONG-TERM SUPPRESSION OF HYDROCARBON VAPORS

[75] Inventors: Sophany Thach, Dallas; Kenneth C. Miller, Richardson; Karen S. Schultz, Dallas, all of Tex.

[73] Assignee: Atlantic Richfield company, Los Angeles, Calif.

[21] Appl. No.: 908,299

[22] Filed: Jul. 2, 1992

Related U.S. Application Data

[63] Continuation of Ser. No. 584,978, Sep. 19, 1990, abandoned.

[51] Int. Cl.[5] .......................... B01J 13/00; B01J 19/16

[52] U.S. Cl. .......................................... 252/307; 252/3; 252/8.05; 252/382; 252/605; 422/42

[58] Field of Search .................. 252/3, 8.05, 307, 382, 252/605; 422/42

[56] References Cited

U.S. PATENT DOCUMENTS

| | | | |
|---|---|---|---|
| 1,807,810 | 6/1931 | Rice | 252/307 X |
| 2,965,678 | 12/1960 | Sundberg et al. | 252/307 X |
| 3,562,156 | 2/1971 | Francen | 252/8.05 |
| 3,637,022 | 1/1972 | Kelly, deceased et al. | 169/44 |
| 3,639,258 | 2/1972 | Corino et al. | 252/315.1 |
| 3,772,195 | 11/1973 | Francen | 252/8.05 |
| 3,850,206 | 11/1974 | Canevari et al. | 141/1 |
| 3,956,138 | 5/1976 | Crockett | 252/3 |
| 4,042,522 | 8/1977 | Falk | 252/8.05 |
| 4,049,556 | 9/1977 | Tujimoto et al. | 252/3 |
| 4,090,967 | 5/1978 | Falk | 252/3 |
| 4,235,743 | 11/1980 | Canevari | 252/382 |
| 4,284,601 | 8/1981 | Chay et al. | 252/382 X |
| 4,326,986 | 4/1982 | Canevari | 252/382 X |
| 4,386,052 | 5/1983 | Canevari | 252/382 X |
| 4,439,328 | 3/1984 | Moity | 252/8.551 |
| 4,442,018 | 4/1984 | Rand | 252/307 |
| 4,612,332 | 9/1986 | Bock et al. | 521/65 |
| 4,770,794 | 9/1988 | Cundasawmy et al. | 252/3 |
| 4,795,590 | 1/1989 | Kent et al. | 252/307 |
| 4,796,702 | 1/1989 | Scherubel | 166/308 |
| 4,836,939 | 6/1989 | Hendrickson | 252/3 |
| 4,859,349 | 8/1989 | Clark et al. | 252/3 |
| 4,963,668 | 10/1990 | Allen et al. | 536/114 |
| 4,999,119 | 3/1991 | Norman et al. | 252/3 |

OTHER PUBLICATIONS

Myers, Drew, *Surfactant Science and Technology*, 1988, pp. 1-15, 22-26, 40-42, 67-71, 90-95, 106-107, 129-132, 142-151, 167-169, 193-195 and 254-272.

*Primary Examiner*—Richard D. Lovering
*Attorney, Agent, or Firm*—Haynes and Boone

[57] ABSTRACT

Novel formulations for aqueous foams which, in the presence of hydrocarbons, can persist for 24 hours or more. The foams are suitable for the suppression of hydrocarbon and polar organic vapors.

16 Claims, 21 Drawing Sheets

HIGH-STABILITY FOAMS FOR LONG-TERM SUPPRESSION OF HYDROCARBON VAPORS

This is a continuation of Ser. No. 07/584,978 filed on Sep. 19, 1990 (now abandoned).

BACKGROUND OF THE INVENTION

1. Field of the Invention

The present invention relates to the field of foams for the suppression of hydrocarbon and polar organic vapors. More specifically, the present invention relates to aqueous foams for the suppression of hydrocarbon and polar organic vapors generated during loading of oil tankers, as well as during the transportation, transfer, storage, and accidental spillage of crude oil and lighter hydrocarbons.

2. Description of the Prior Art

During loading of oil tankers, and during the transportation, transfer, storage, and accidental spillage of crude oil and lighter hydrocarbons, a large quantity of vapors may be released which poses a fire hazard, as well as a threat to life or the environment. A vapor-recovery system can be used to remove the released hydrocarbon vapors, which vapors can then be incinerated later. This method, however, is expensive and ultimately releases carbon dioxide into the atmosphere.

Another possibility is suggested by U.S. Pat. No. 3,639,258 to Corino which involves the use of a gelling material to create an integral roof by gelling the upper layer of the oil in a tank to provide a floating roof of the same material. This technique, while useful for some purposes, creates considerable difficulties in cleaning and maintaining tanks or tanker compartments.

Alternatively, as suggested in U.S. Pat. No. 3,850,206 to Canevari et al. a foamed vapor barrier can be used to suppress the release of volatile hydrocarbons. The vast majority of conventional aqueous foams and foams for fire-fighting/vapor suppression, however, do not persist for more than 30 minutes and only a few persist for up to 2 hours. Accordingly, conventional aqueous foams do not persist for a sufficient time to allow their use in connection with the suppression of the release of hydrocarbon vapors during a lengthy procedure such as the loading of a tanker which takes from 16 to 20 hours. Adding to the foam solution a water thickener such as a polysaccharide, polyacrylamide or sulfonated polystyrene, as prescribed in Canevari et al. '206, extends the foam stability to no more than a few hours, especially when the temperature exceeds 90° F.

In general, protein and fluoroprotein foams are capable of suppressing vapors of non-polar hydrocarbons below the lower explosive limit (LEL), usually about 2% or less of hydrocarbon gas in the air, for up to a few hours, but are not very effective against polar compounds.

Likewise, high-expansion foams of synthetic detergents and aqueous film-forming foams (AFFF), which form a spreading protective film over the hydrocarbon surface, are also capable of suppressing vapors of non-polar hydrocarbons for up to a few hours, but are equally ineffective against polar hydrocarbons.

Similarly, alcohol-type foams (ATF) consisting of a protein, surfactant, fluoroprotein or AFFF base and a metal stearate or polymer additive are capable of being effective for up to a few hours against polar hydrocarbons. In contrast, AFFF coupled with a polyurethane foam, e.g. the Light Water ® ATC product sold by 3M, is very effective for longer suppression of polar and non-polar vapors. This product yields a semi-solid polyurethane foam with excellent mechanical strength. However, this type of foam leaves behind a non-collapsible polyurethane residue which is difficult to dispose of. Furthermore, all AFFF type foams contain a large amount of fluorocarbon surfactants which, although mostly inert, are not biodeqradable and must be disposed of in a landfill.

In any case, however, for most formulations, high-quality or high expansion foams having expansion ratios on the order of 100:1 to 1000:1 (100 to 1000 parts of gas for one part of foam solution) are the best types of foam for suppressing the release of volatile hydrocarbon vapors.

Three factors have been observed to control foam stability. In the first stage of foam life, water drainage controls foam stability. As water drains from the foam films (or lamellae), the films thin quickly to a small thickness. This stage usually lasts only a few minutes and is not very destructive to the bubbles. In the second stage of foam decay, the bubbles begin to slowly collapse, or coalesce into fewer but larger bubbles. Gas diffusion and, more importantly, water evaporation from the foam lamellae are the main causes of collapse at this stage. In the third and final stage, foam lamellae become so thin that small perturbations such as vibrations, shocks or sudden pressure or temperature changes, cause the remaining foam column to collapse catastrophically. All three stages of foam life usually last for less than a few hours. To further extend foam life, foam stability must be improved in all stages. Specifically, film drainage and water evaporation must be reduced, while mechanical strength must be improved.

In the presence of hydrocarbons, two additional factors further accelerate foam decay. First, hydrocarbon diffusion through the foam tends to destroy bubbles near the water-hydrocarbon interface. Second, surface active materials in the foam lamellae which are soluble in the hydrocarbons tend to partition into the hydrocarbons causing sudden collapse of the bubbles at the hydrocarbon interface.

The present invention overcomes the above-discussed disadvantages and drawbacks of the prior art. The present invention relates to new foam formulations with long stabilities in the presence of hydrocarbon and polar organic vapors. The formulations of the present invention include surface active materials and multi-functional additives which are selected to produce highly-stable foams, which will persist in the presence of hydrocarbon and polar organic vapors for several days at temperatures below 90° F., and up to 24 hours at 105° F. Unlike AFFF-polyurethane type foams, however, the formulations of the present invention leave behind only water-soluble residues, and a negliqible amount of fluorocarbons.

SUMMARY OF THE INVENTION

The present invention provides foam compositions for suppressing hydrocarbon and polar organic vapors. Foams produced from the formulations of the present invention persist for a period of between twelve hours and several days a temperatures ranging from 75 to 105° F. The foam formulations of the present invention are capable of producing medium-to high-expansion foams containinq at least 10 parts gas, such as nitrogen, flue gas and air and 1 part dilute foam solution.

Concentrated foam solutions according to the present invention comprise a water soluble nonionic surfactant, a fluorinated co-surfactant, a stabilizer and a viscosifier.

Dilute foam solutions according to the present invention comprise a water-soluble nonionic surfactant, a fluorinated co surfactant, a stabilizer, a viscosifier and water.

Those skilled in the art will further appreciate the above-described features of the present invention together with other superior aspects thereof upon reading the detailed description which follows.

DESCRIPTION OF PREFERRED EMBODIMENTS

Figure 1:
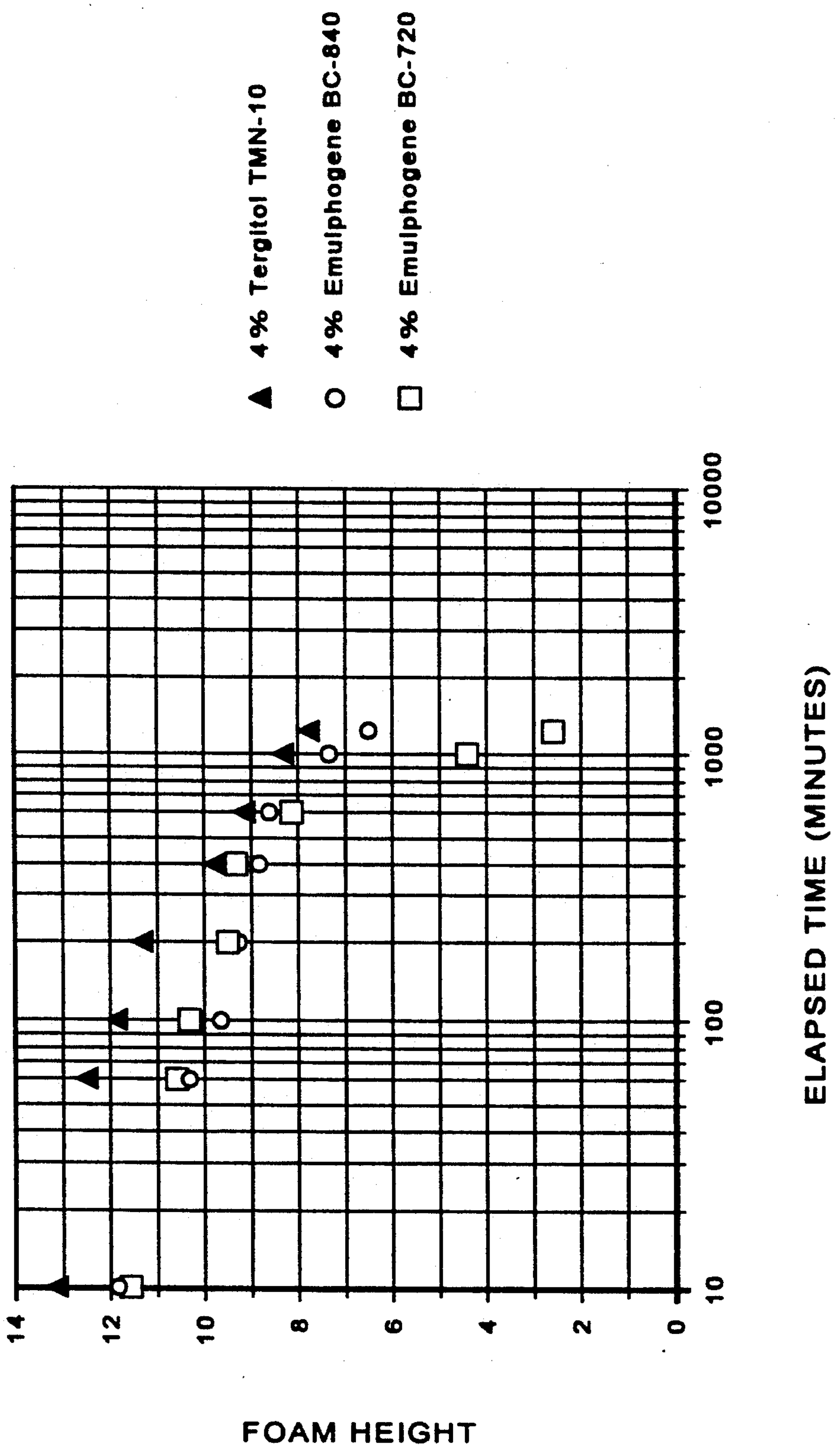
FIG. 1 is a graph showing the foaminess and foam stability of various foam formulations according to the present invention.

The present invention relates to aqueous foams for suppressing the release of hydrocarbon and polar organic vapors into the atmosphere, thus reducing environmental, health and safety risks. The foam formulations of the present invention yield foams that persist from 12 hours to several days at temperatures ranging from 75 to 105° F.

Dilute foam solutions according to the present invention comprise a water-soluble nonionic surfactant, a fluorinated co-surfactant, a stabilizer, a viscosifier and water. According to a preferred embodiment, the dilute foam solution comprises about 0.1 to 6.0% by weight, preferably about 2.0 to 4.0% by weight, of the water-soluble nonionic surfactant, about 0.01 to 1.0% by weight, preferably about 0.2 to 0.4% by weight of the fluorinated co-surfactant, about 1.0 to 10.0% by weight, preferably about 2.0 to 6.0% by weight of the stabilizer, about 500 to 5,000 parts per million (ppm), preferably 1,000 to 2,500 ppm, of the viscosifier, and the balance being comprised of water.

Concentrated foam solutions according to the present invention comprise the water-soluble nonionic surfactant, the fluorinated co-surfactant, the stabilizer and the viscosifier. According to a preferred embodiment, the concentrated foam solution comprises about 9.0 to 34.0% by weight of the water-soluble nonionic surfactant, about 1.0 to 6.0% by weight of the fluorinated co-surfactant, about 57.0 to 85.0% by weight of the stabilizer and about 3.0 to 5.0% by weight of the viscosifier.

The water-soluble nonionic surfactant preferably is highly water soluble, is insoluble in nonpolar hydrocarbons and is very slightly soluble in polar hydrocarbons. The water-soluble nonionic surfactant preferably has a very low air/water surface tension. The water-soluble nonionic surfactant preferably produces a large amount of foam and interacts strongly with the viscosifier of the composition enhancing its tendency to remain in water.

As noted above, preferred dilute foam solutions according to the present invention comprise 0.1 to 6.0% by weight of the water-soluble nonionic surfactant. The foam solutions will tend to be less stable if less than 0.1% by weight of the water-soluble nonionic surfactant is included. However, including in the foam solutions more than 6.0% by weight of the water-soluble nonionic surfactant in the foam solutions will raise the cost of the solutions but will not compromise their performance.

The water-soluble nonionic surfactant may be selected from the family of alkylpolyethylene-glycol ethers wherein the alkyl chain contains 8 to 16 carbon atoms, and preferably 12 to 13 carbon atoms and wherein the water-soluble moiety contains about 4 to 40, and preferably about 10 to 20, ethylene oxide repeating units. Suitable alkylpolyethylene-glycol ethers are trimethyl nonylpolyethylene-glycol ether which is commercially available as Tergitol TMN-10 or TMN-6 from Union Carbide Corporation and Emulphogene BC-720 ($C_{13}EO_{9.75}$) or BC-840 ($C_{13}EO_{15}$) from Rhone-Poulenc.

The fluorinated co-surfactant, preferably, is very slightly soluble in oil, is highly soluble in water and is highly surface-active to induce the spreading of film over the hydrocarbon to protect the produced foams against crude oil. The fluorinated co-surfactant also increases foam fluidity. The fluorinated co-surfactant preferably includes a long chain fluoroalkyl group. The fluorinated co-surfactant may be selected from the group of fluorinated quaternary ammonium halides, especially iodides and chlorides, or may be a fluorinated alkateric (anionic and cationic) surfactant. A suitable fluorinated quaternary ammonium chloride is commercially available as Fluorad FC-754 from Minnesota Mining and Manufacturing Company, Inc. (3M). A suitable fluorinated quarternary ammonium iodide is commercially available as Fluorad FC-750 from 3M.

The stabilizer, preferably, is highly soluble in water, has a very high affinity for water, increases the film thickness and mechanical strength, promotes the formation of structured liquid phases in the film, improves foam fluidity, and reduces the freezing point of the dilute foam solution. By virtue of increasing the film thickness and mechanical strength, the stabilizer reduces the rates of gas diffusion through and water evaporation from the foams. The stabilizer, preferably, is selected from the family of polyols. Suitable polyols are glycerol, ethylene glycol, polyethylene glycol and combinations thereof. The polyethylene glycol, preferably, has a molecular weight of about 600 to 4000.

The viscosifier, preferably, is a high-viscosity polysaccharide or a biopolymer that is highly interactive with the water-soluble nonionic surfactant and the fluorinated co-surfactant of the composition. Also, the viscosifier, preferably, has good water solubility and very low oil solubility. The viscosifer increases the foam stability by retarding water drainage, reducing water evaporation, and increasing the film thickness. The viscosifier greatly improves the mechanical strength of the film. A suitable viscosifier for use in the compositions of the present invention is xanthan gum having a molecular weight of about 1 million to 10 million, preferably about 4 million, which is commercially available from Kelco in different grades, for example as Kelzan, Xanvis and Keltrol, as a highly active powder with varying amounts and types of impurities, such as cell debris, or as a 4.0% by weight broth, or from Pfizer as a 4.0 to 11.7% by weight broth, for example Flocon 4800 MT. If xanthan gum having a molecular weight of less than 1 million is used in the foam compositions, the compositions will tend to be less stable. An additional suitable viscosifier is a biopolymer known as Welan gum.

The final foam is generated at an expansion ratio of from about 10 to 1000 or higher parts of gas such as nitrogen, flue gas and air to 1 part dilute foam solution. Commercially available and conventional proportioning units and foam generators such as aspirator-type generators for medium expansion ratios up to about 200 and fan-type generators for high expansion ratios above 200 may be used to produce the final foam. Those skilled in the art will recognize that the foams of the present invention may be produced by any conventional proportioning units and foam generators.

For the highest foam stability having a persistence of about 3-5 days below 90° F. and about 24 hours at 105° F., a preferred formulation comprises 4% by weight of trimethylnonyl-polyethylene glycol ether, 0.4% by weight of a fluorinated quarternary ammonium chloride, 6% by weight of glycerol, 1600 ppm of xanthan gum; and water.

Those of ordinary skill in the art will recognize that the stability of the foams generally increases as the concentration of each component in the formulation increases.

As with most fire-fighting foams, the foam concentrate of the present invention may be used for ease of storage. The foam concentrate of the present invention may be subsequently diluted with water at the time of the application. Long-term storage (over a few days) requires inclusion of a biocide as a safety precaution against biodegradation although the water-soluble nonionic surfactant and the fluorinated co-surfactant in the concentrate should suppress biodegradation for a few days. Accordingly, the foam compositions of the present invention may also include a suitable biocide such as formaldehyde or glutaraldehyde. The composition, preferably, includes 500 ppm formaldehyde or 125 ppm glutaraldehyde.

The formulations of the present invention, preferably, are used as medium to high-expansion foams, which offer many advantages. First, they require a relatively small amount of water and surfactants, thus minimizing hydrocarbon contamination after foam collapse. Second, high-expansion foams may be generated at a very high rate (from 1000 to 30,000 $ft^3$ of foam per minute), thus minimizing the duration of foam application. Using a fan-blower for high-expansion foams, a one-foot thick foam blanket for a one-million-barrel tanker (about 15,000 barrels or 90,000 $ft^3$ of foam) may be generated in 10 minutes to two hours.

As the foam of the present invention collapses, the water-soluble components of the foam solution drain to the bottom of the tanker. Specifically, all of the fluorinated co-surfactant (at most 1.0% by weight of the foam solution), most of the nonionic surfactant (over 80% of the original amount used), and all of the stabilizer and viscosifier drain to the bottom of the tanker. With mixing, this aqueous solution may be suspended in the oil. Only about 20% of the original amount used of the nonionic surfactant partitions into the oil. Accordingly, essentially all of the constituents of the foam solution will be removed from the hydrocarbon in conventional settling tanks and desalting units at a hydrocarbon refinery.

Given the small amount of foam solution in the tanker (less than 100 ppm of the oil), the surfactant concentration in the oil delivered to the refinery should also be correspondingly small, i.e. less than 4 ppm. Even without partition into water during washing, this amount of surfactant is probably too small to cause problems in further oil processing stages.

The foam formulations of the present invention offer many advantages over existing foams. Specifically, the foams of the present invention persist for 12 hours to several days, as opposed to most existing fire-fighting foams which last for 30 minutes to two hours.

The foams of the present invention also provide effective vapor suppression for 12 hours to several days, as opposed to AFFF-type foams which may provide vapor suppression for about two hours. Compared to the AFFF-polyurethane combination, the formulations of the present invention provide effective vapor suppression. The foams of the present invention suppress 80 to 95% of the hydrocarbons evaporated from crude oils at temperatures of 90 to 105° F.

Moreover, unlike the AFFF-polyurethane combination, which leaves a residue of solid polyurethane foam and a large amount of non-biodegradable fluoroalkyl surfactants, foams produced according to the composition of the present invention collapse at the end leaving mostly water-soluble and biodegradable materials in the drained liquid.

Furthermore, with the long-lasting foams of the present invention, one application is sufficient to reduce the rate of vapor release for example for the entire loading of a tanker, whereas many applications are necessary with shorter-lived foams for the same protection. Indeed, short-lived foams requiring repeated application may not be feasible for suppressing hydrocarbon vapor release during the loading of a tanker because of time demand, cost and the consequent large amount of drained liquid.

The foam persistence of the compositions of the present invention may be adjusted with the same concentrate by varying the dilution with water, or by changing the amount and identity of the stabilizer. Finally, the foam formulations of the present invention may be used with either fresh water or water containing up to 2.0% salt. The foam formulations of the present invention were destroyed by water containing more than 2.0% salt.

The present invention will be described in more detail with reference to the following examples. These examples are merely illustrative of the present invention and are not intended to be limiting.

EXAMPLE 1

Foam Stability

The constituents of a foam solution according to the present invention were mixed in a 25-ml graduated cylinder to make up 10 grams of aqueous solution. The solution was heated to 105° F. and then hand-shaken vigorously to produce a foam column which usually filled the graduated cylinder. 5 ml of crude oil was added to the bottom of the container, and the container was then placed inside a 105° F. oven. A video camera system monitored the foam decay for 24 hours. For a given foam solution, this procedure does not accurately reproduce the actual foam height that would be generated within a tanker. However, this procedure does provide an accurate model of foam decay so that an assessment of foam stability can be made.

The highly stable foams of the present invention decay in three stages. The foams remain virtually unchanged for about 30 minutes (time $T_i$), then decay at a very slow rate (usually about 0.5 cm or 0.2 inch per hour) for about 10 hours ) ($T_s$) after which time they begin to quickly collapse and finally disappear ($T_d$). This behavior suggests that phenomena other than liquid drainage control long-term foam stability. Liquid drainage in conventional foams causes a very rapid foam decay in the first few minutes or even seconds, followed by a slower rate of decay, which is likely caused by water evaporation and biodegradation of polymer within the foam.

Table 1 below summarizes the results of stability tests conducted on various foams according to the present invention. All formulations tested and represented in Table 1 include 4% by weight Tergitol TMN-10, 0.4% by weight Fluorad FC-754, 1600 ppm Xanthan gum (with 500 ppm formaldehyde) and water. In Table 1 "GLY" refers to glycerol, "EG" refers to ethylene glycol, "PEG" refers to polyethylene glycol and "$T_{1/2}$" refers to the time it takes the foam column to collapse to half of its original height.

TABLE 1

OPTIMIZING FOAM FORMULATION WITH GLYCEROL, ETHYLENE GLYCOL & POLYETHYLENE GLYCOLS

| GLY % | EG % | PEG-600, % | PEG-4000, % | $T_i$ Hours | $T_s$ Hours | $T_{1/2}$ Hours | $T_d$ Hours | Observations |
|---|---|---|---|---|---|---|---|---|
| — | — | — | 4 | 0.4 | 5 | 5.5 | 16 | Thin foam |
| — | — | — | 2 | 0.5 | 4 | 7.5 | 17.5 | Thin foam |
| 4 | 4 | — | — | 0.1 | 3 | 3.5 | 7 | — |
| 4 | 2 | 4 | — | 0.1 | 3 | 3.5 | 7 | — |
| — | 4 | 4 | — | 0.1 | 3 | 3.5 | 7 | — |
| 4 | — | — | — | 0.8 | 15 | 17 | 35 | Stable foam |
| 6 | — | — | — | 0.8 | 15 | 17 | 35 | Stable foam |
| — | 4 | — | — | 0.7 | 10 | 12 | 23 | Stable foam |
| — | 6 | — | — | 0.7 | 10 | 12 | 23 | Stable foam |
| — | — | 4 | — | 0.7 | 10 | 12.5 | 30 | Thin foam |
| — | — | 6 | — | 0.7 | 10 | 18 | 30+ | Thin foam |
| — | — | — | 4 | 0.7 | 10 | 10.5 | 18 | Thin foam |
| — | — | — | 6 | 0.7 | 10 | 11 | 24 | Thin foam |

FIGS. 1 through 12 illustrate the results of stability tests conducted on various foams according to the present invention. All formulations tested and represented in FIGS. 1 through 12 include 4.0% by weight Tergitol TMN-10, 0.4% by weight Fluorad FC-754, 6.0% by weight glycerol, 1600 ppm xanthan gum (with 500 ppm formaldehyde) and water, unless otherwise specified.

FIG. 1 is a graph of foaminess and foam stability for foams including 4% by weight of Tergitol TMN-10, Emulphogene BC-720 or Emulphogene BC-840. As shown in FIG. 1, foams made with each surfactant persisted for more than 15 hours although foams made with Tergitol TMN-10 and Emulphogene BC-840 had slightly greater stability than foams made from Emulphogene BC-720. Also as shown in FIG. 1, foams made with Tergitol TMN-10 have greater foaminess than foams made with Emulphogene BC-840 and Emulphogene BC-720, while foams made with Emulphogene BC-840 have essentially the same foaminess as foams made with Emulphogene BC-720.

Figure 2:
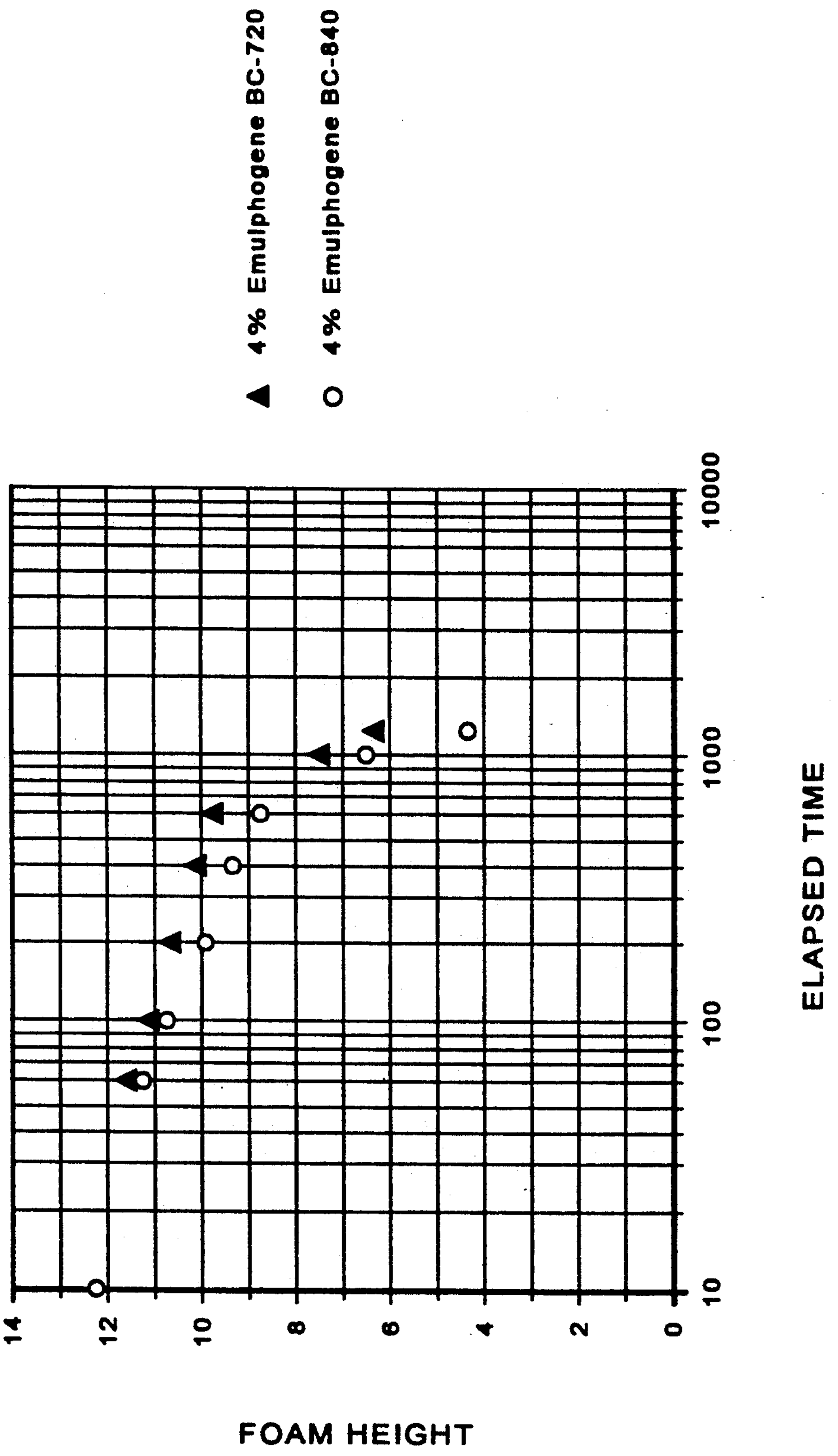
FIG. 2 is a graph showing the foaminess and foam stability of various foam formulations according to the present invention.

FIG. 2 is a graph of foaminess and foam stability for foams including 2% by weight of glycerol and 4% by weight of ethylene glycol as the stabilizer and 4% by weight of either Emulphogene BC-720 or Emulphogene BC-840. As shown in FIG. 2, foams made with each surfactant persisted for more than 15 hours although foams made with Emulphogene BC-720 have greater stability and foaminess than foams made with Emulphogene BC-840.

Figure 3:
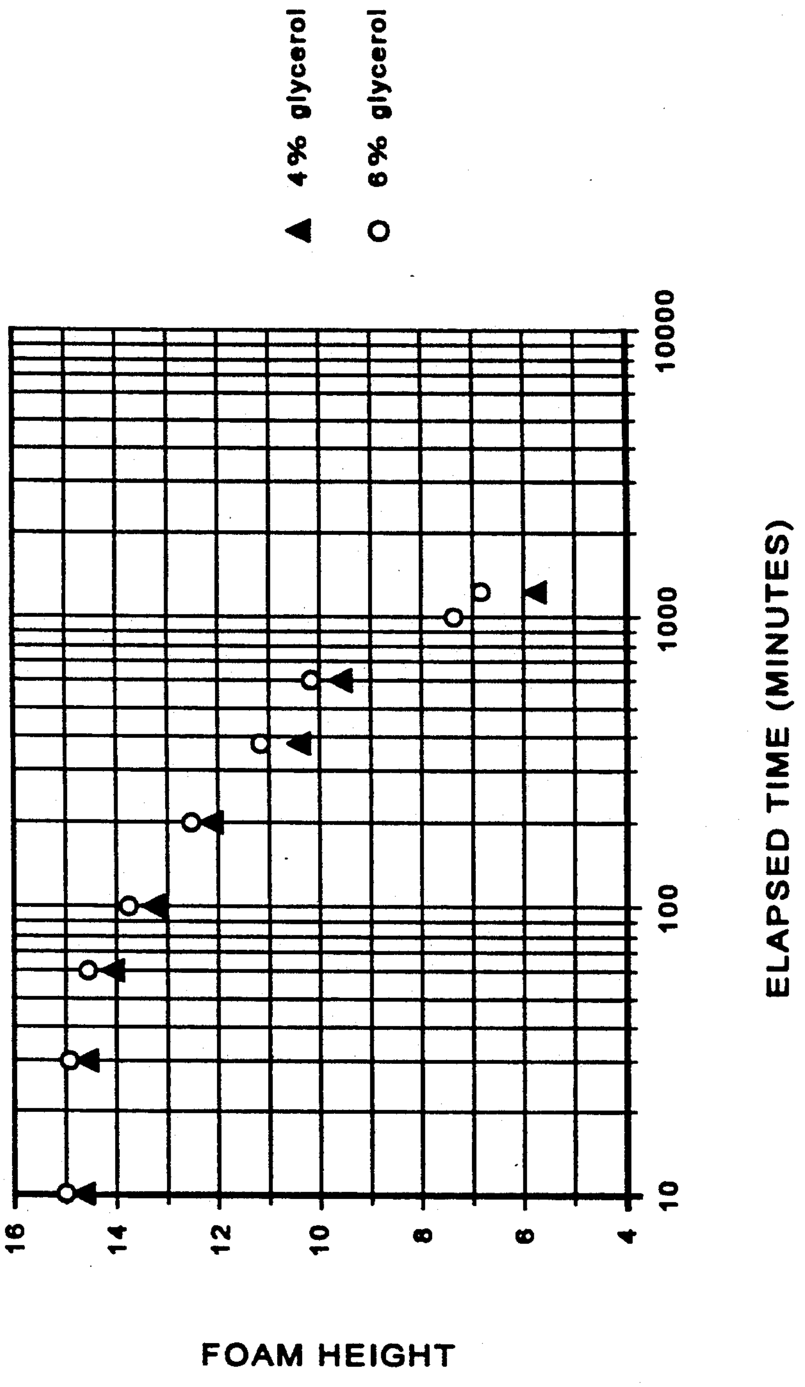
FIG. 3 is a graph showing the foaminess and foam stability of various foam formulations according to the present invention.

FIG. 3 is a graph of foaminess and foam stability for foams including either 4% or 6% by weight of glycerol. As shown in FIG. 3, foams made with either percentage of stabilizer persisted for more than 15 hours and had approximately the same stability. However, foams made with 6% by weight of glycerol had slightly greater foaminess than foams made with 4% by weight of glycerol.

Figure 4:
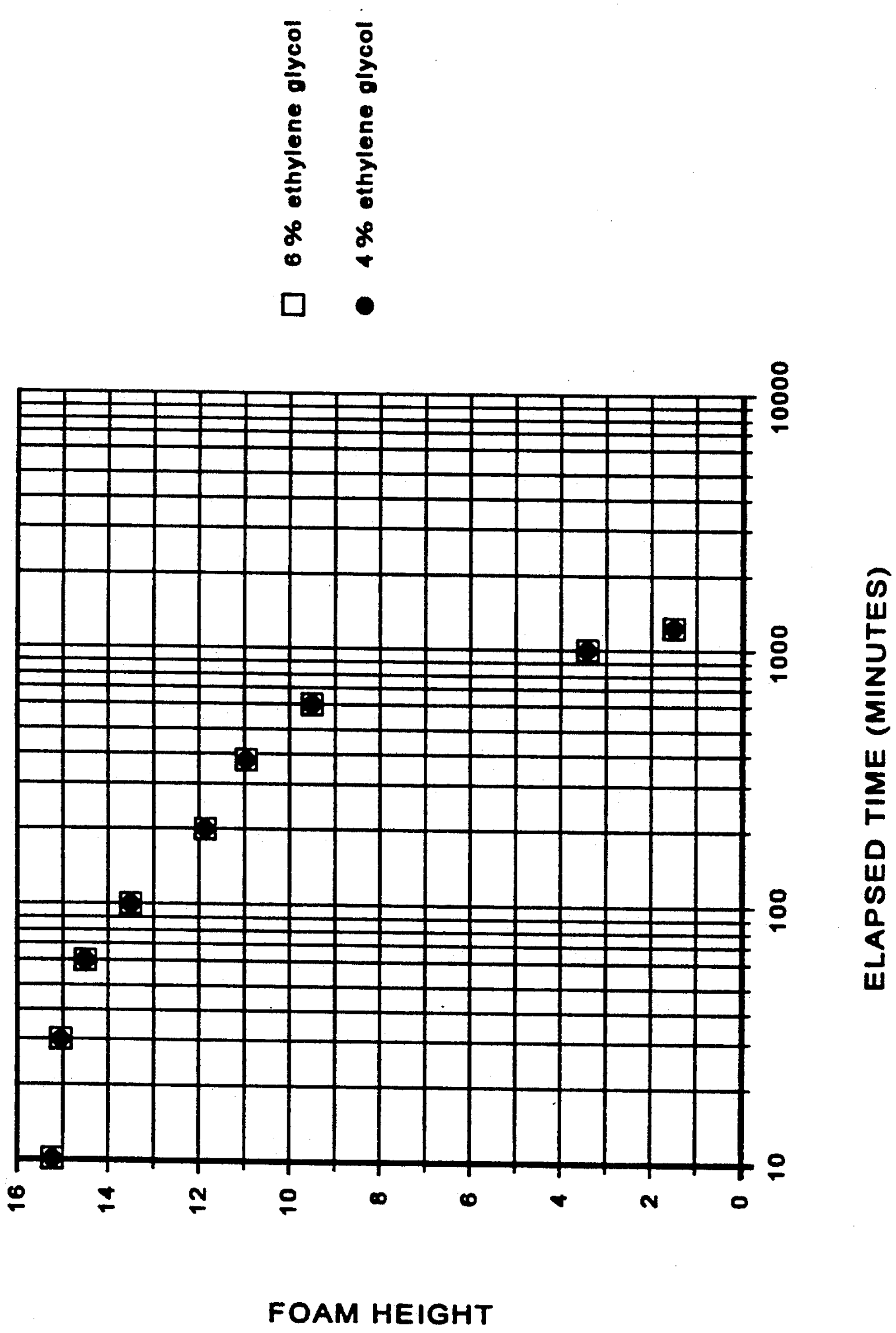
FIG. 4 is a graph showing the foaminess and foam stability of various foam formulations according to the present invention.

FIG. 4 is a graph of foaminess and foam stability for foams including either 4% or 6% by weight of ethylene glycol. As shown in FIG. 4, foams made with either percentage of stabilizer persisted for more than 15 hours and had approximately the same stability and foaminess.

Figure 5:
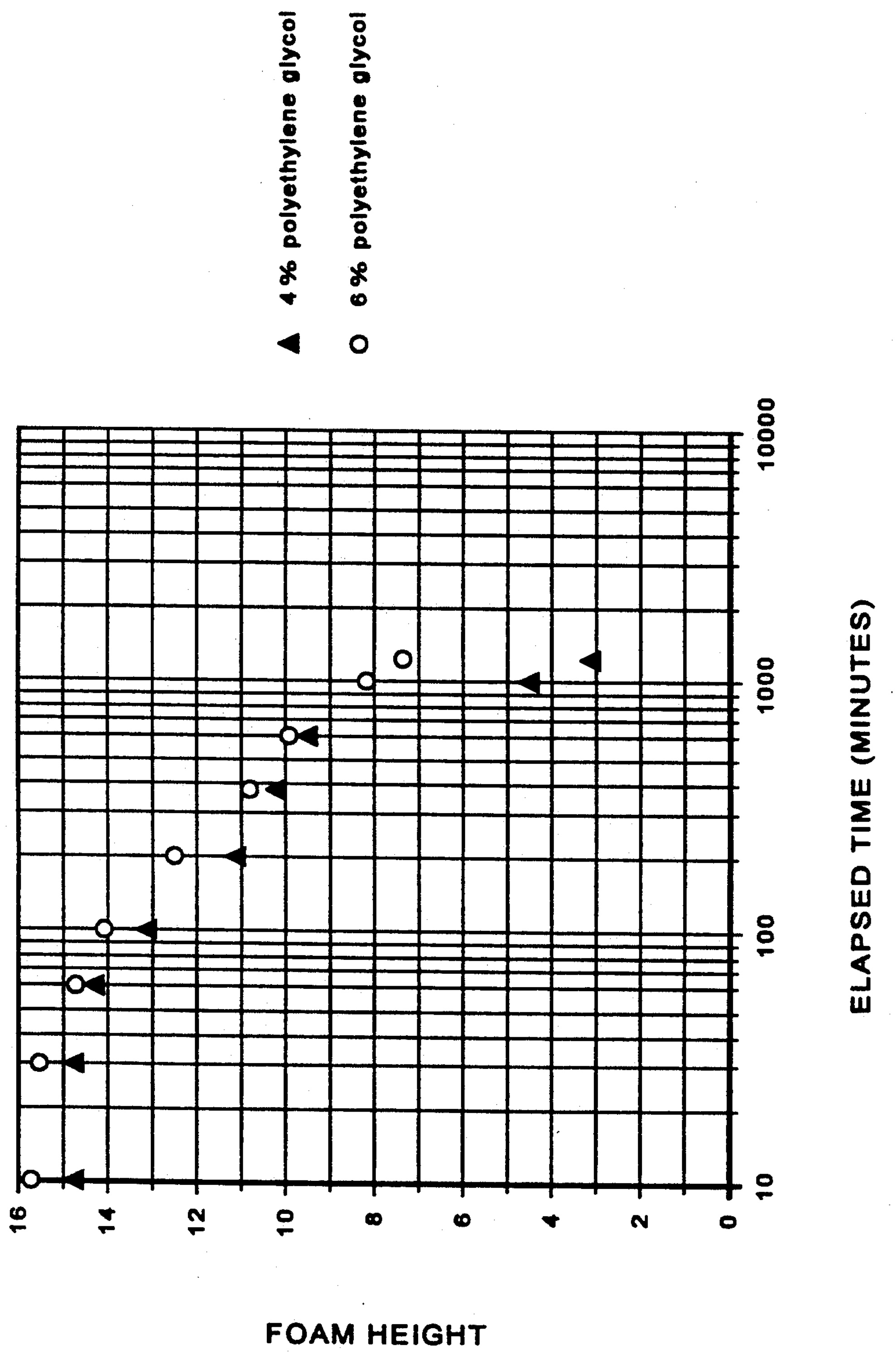
FIG. 5 is a graph showing the foaminess and foam stability of various foam formulations according to the present invention.

FIG. 5 is a graph of foaminess and foam stability for foams including either 4% or 6% by weight of polyethylene glycol having a molecular weight of 600. As shown in FIG. 5, foams made with either percentage of stabilizer persisted for more than 15 hours, although foams made with 6% by weight of polyethylene glycol having a molecular weight of 600 have greater stability and foaminess than foams made with 4% by weight of polyethylene glycol having a molecular weight of 600.

Figure 6:
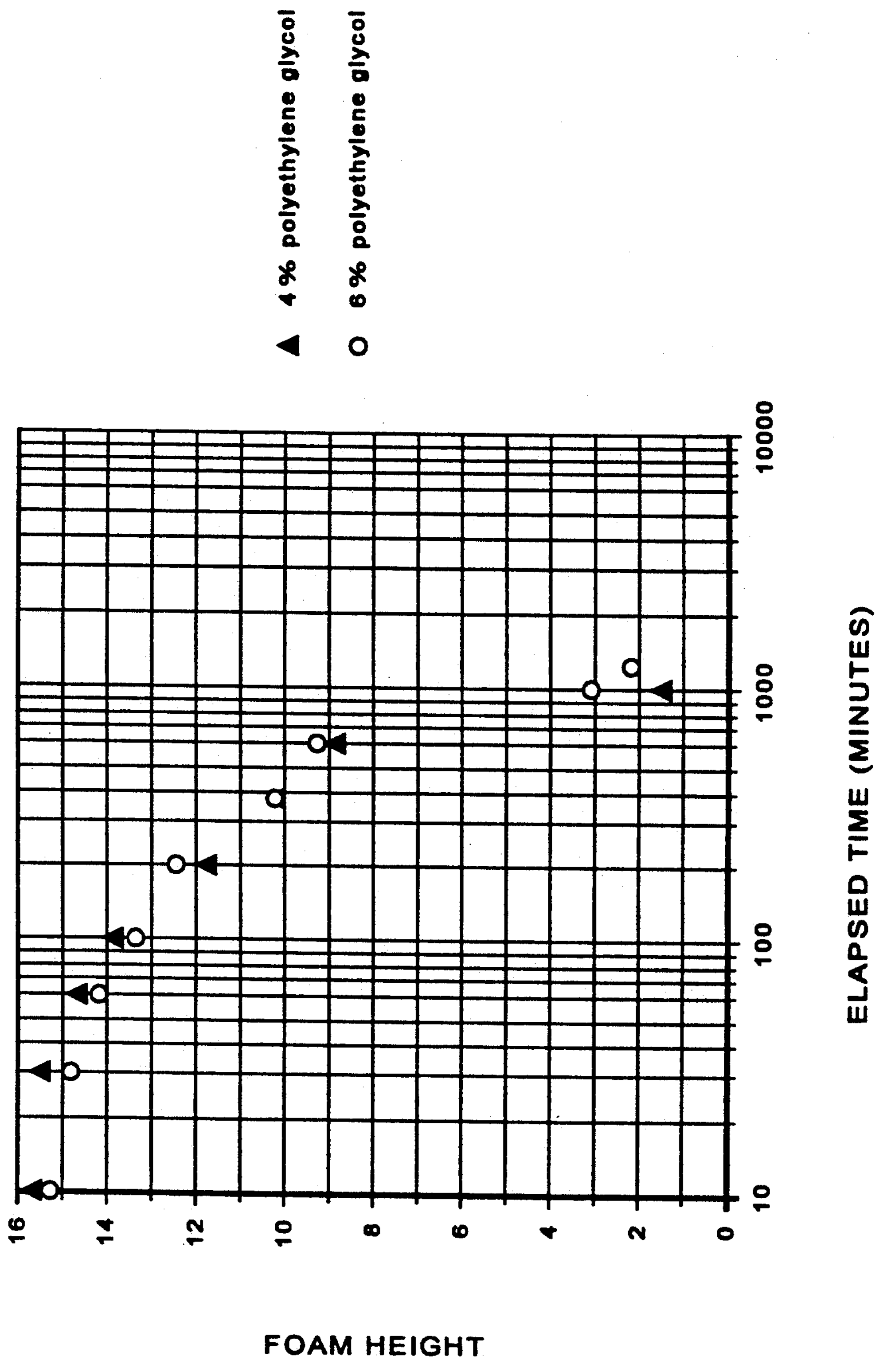
FIG. 6 is a graph showing the foaminess and foam stability of various foam formulations according to the present invention.

FIG. 6 is a graph of foaminess and foam stability for foams including either 4% or 6% by weight of polyethylene glycol having a molecular weight of 4000. As shown in FIG. 6, foams made with either percentage of stabilizer persisted for more than 15 hours and had approximately the same stability and foaminess.

Figure 7:
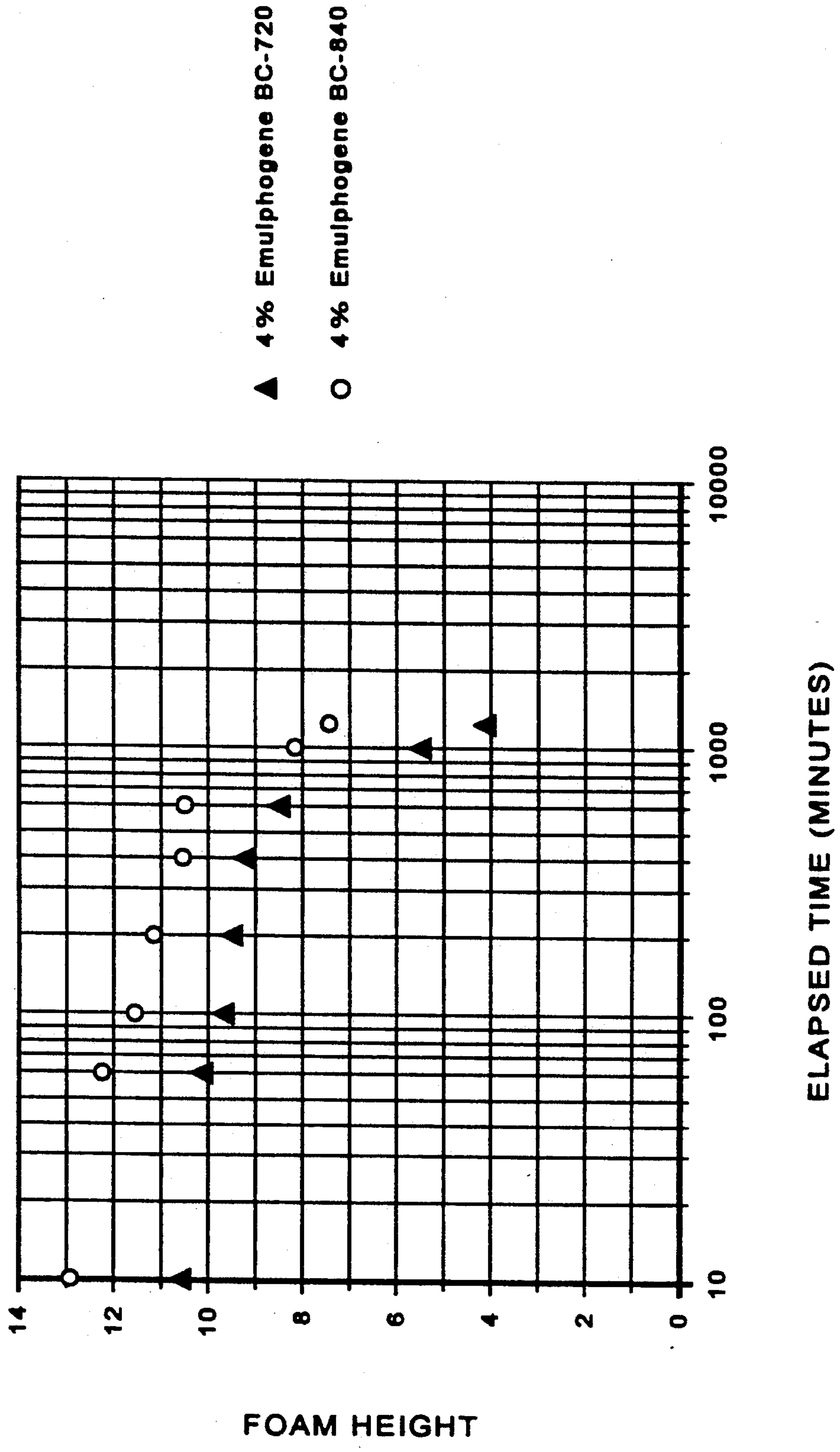
FIG. 7 is a graph showing the foaminess and foam stability of various foam formulations according to the present invention.

FIG. 7 is a graph of foaminess and foam stability for foams including 6% by weight of ethylene glycol as the stabilizer and either 4% by weight of Emulphogene BC-720 or Emulphogene BC-840. As shown in FIG. 7, these foams persisted for more than 15 hours and had similar stabilities while foams made with 4% by weight of Emulphogene BC-840 had greater foaminess than foams made with 4% by weight of Emulphogene BC-720.

Figure 8:
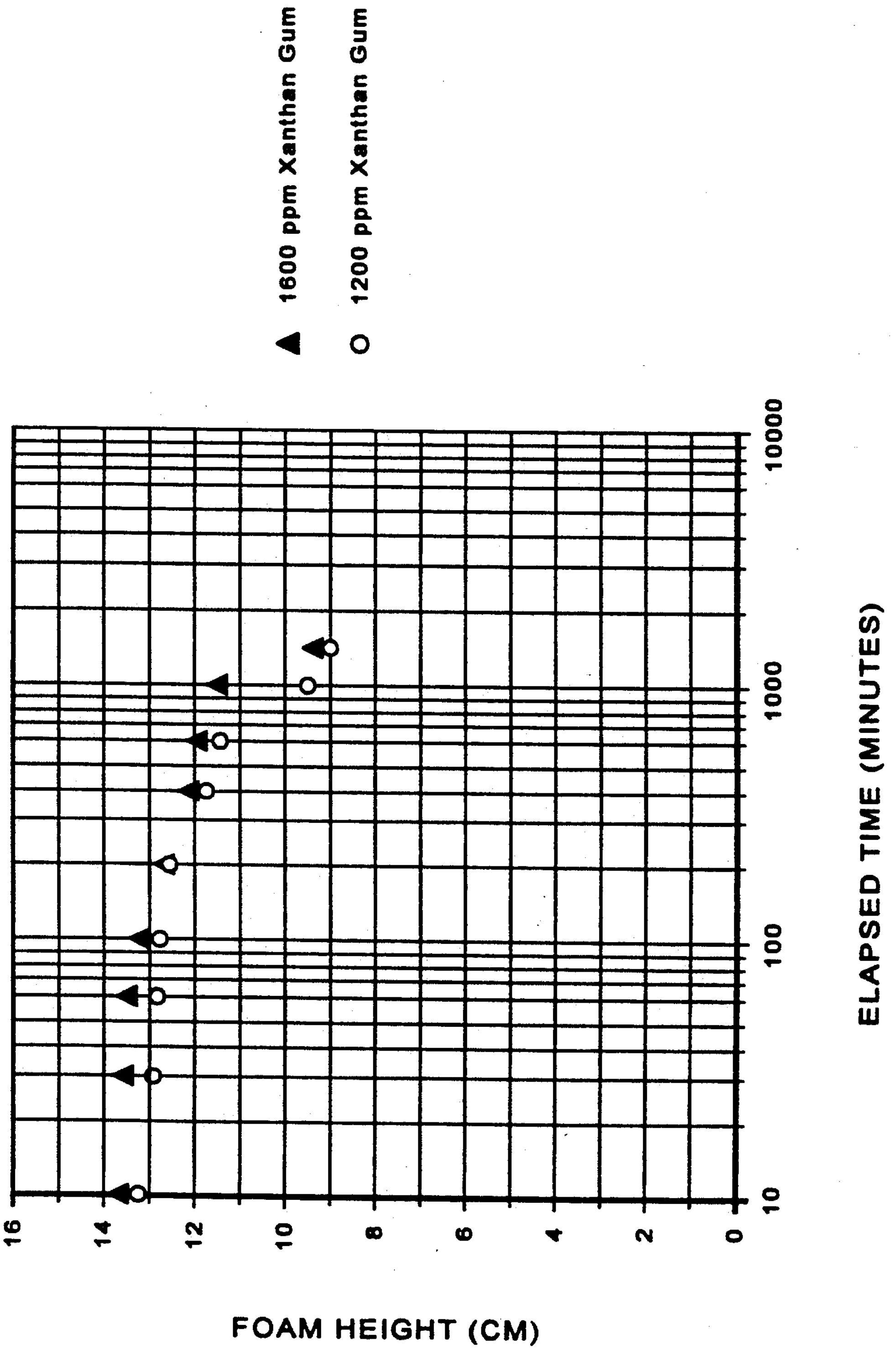
FIG. 8 is a graph showing the foaminess and foam stability of various foam formulations according to the present invention.

FIG. 8 is a graph of foaminess and foam stability for foams including 2% by weight of Tergitol TMN-10, 0.2% by weight of Fluorad FC-754 and 4% by weight of glycerol with either 1600 or 1200 ppm xanthan gum. As shown in FIG. 8, foams made with either amount of xanthan gum persisted for more than 15 hours and had approximately the same stability and foaminess.

Figure 9:
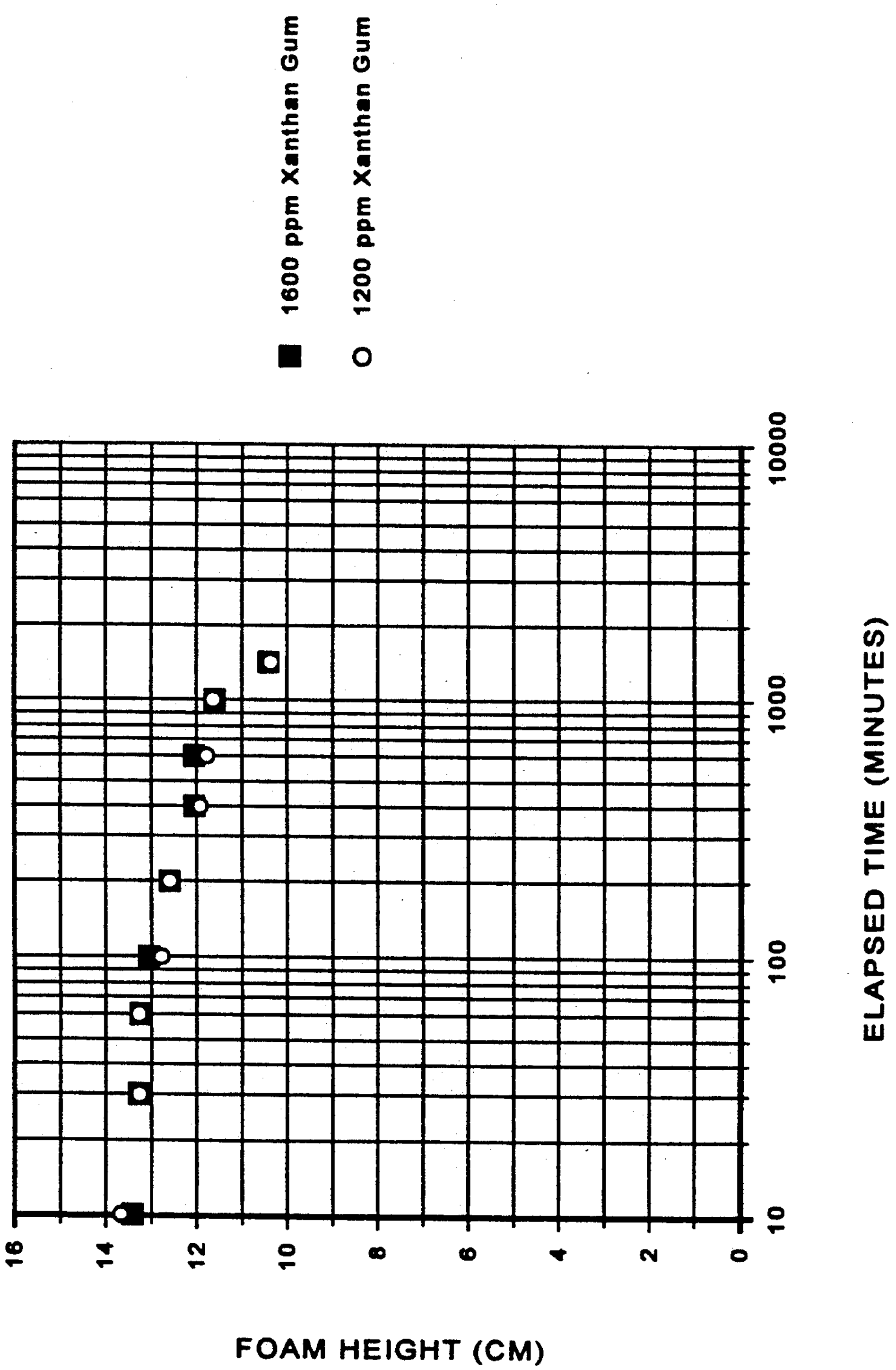
FIG. 9 is a graph showing the foaminess and foam stability of various foam formulations according to the present invention.

FIG. 9 is a graph of foaminess and foam stability for foams including 3% by weight of Tergitol TMN-10, 0.3% by weight of Fluorad FC-754 and 4% by weight of glycerol with either 1600 or 1200 ppm xanthan gum. As shown in FIG. 9, foams made with either amount of xanthan gum persisted for more than 15 hours and had approximately the same stability and foaminess.

Figure 10:
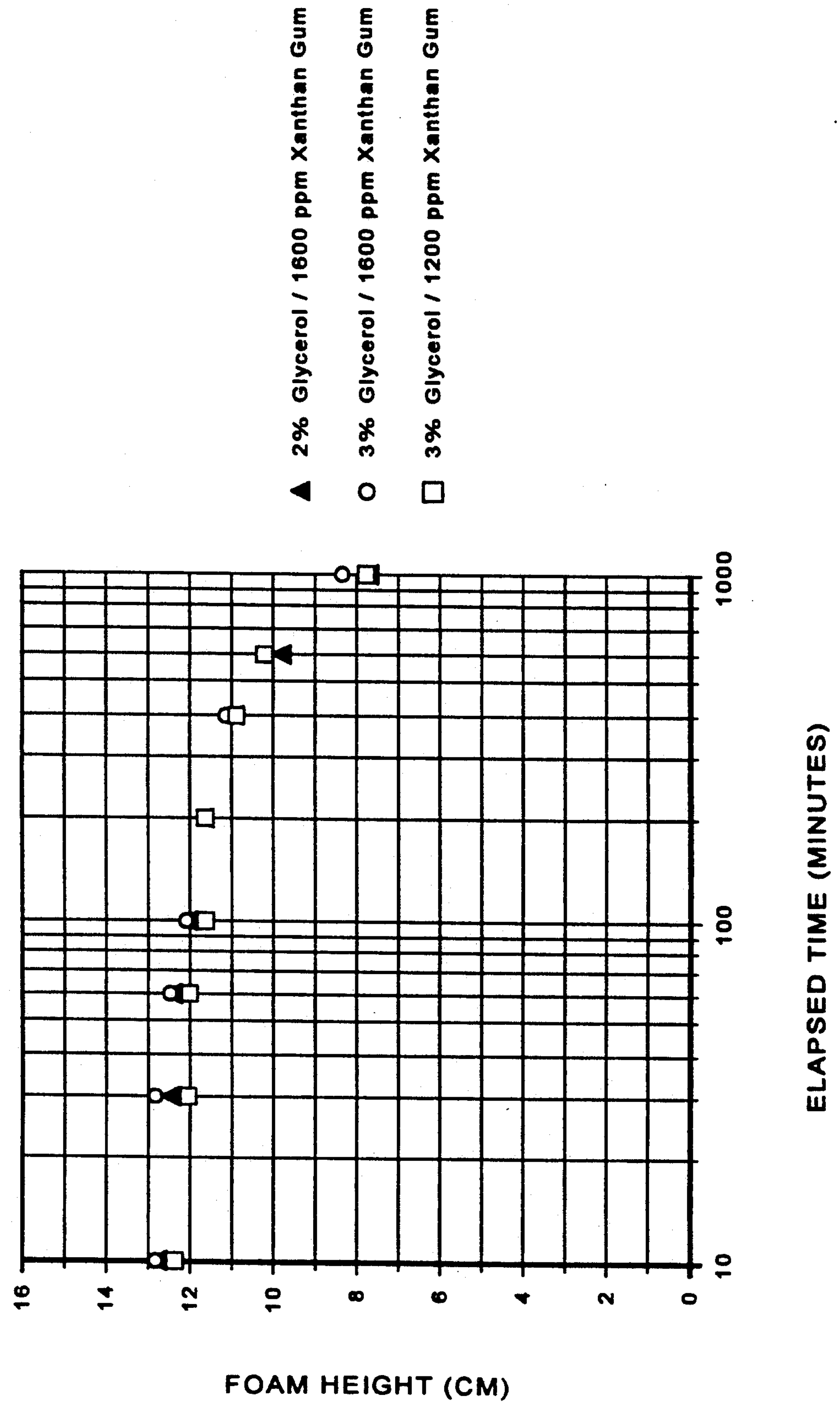
FIG. 10 is a graph showing the foaminess and foam stability of various foam formulations according to the present invention.

FIG. 10 is a graph of foaminess and foam stability for foams including 2% by weight of Tergitol TMN-10, 0.2% by weight of Fluorad FC-754 with 2% by weight of glycerol and 1600 ppm xanthan gum, 3% by weight of glycerol and 1600 ppm xanthan gum, or 3% by weight of glycerol and 1200 ppm xanthan gum. As shown in FIG. 10, these foams persisted for more than 15 hours and had approximately the same stability and foaminess.

Figure 11:
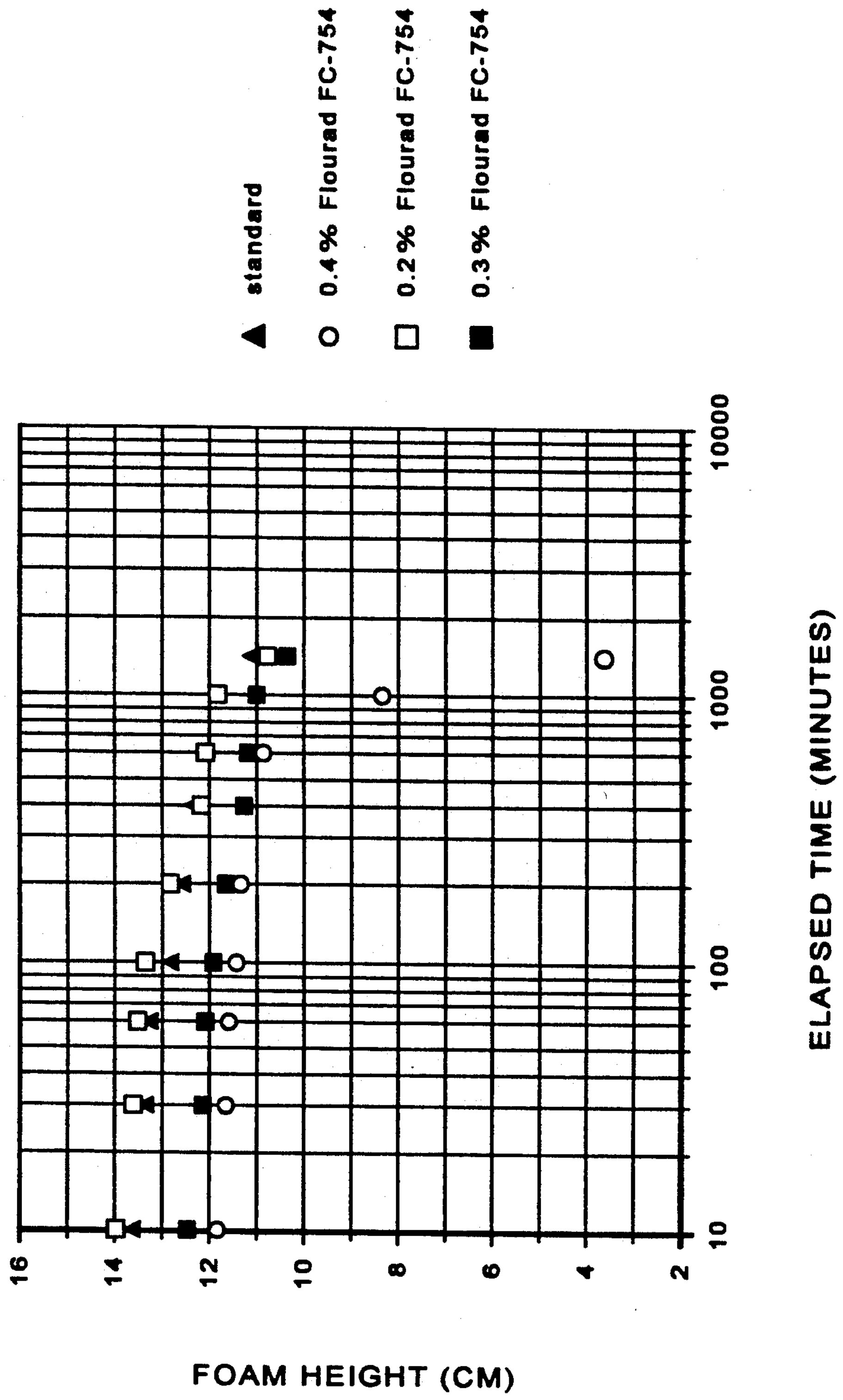
FIG. 11 is a graph showing the foaminess and foam stability of various foam formulations according to the present invention.

FIG. 11 is a graph of foaminess and foam stability for the standard foam formulation (4.0% by weight Tergitol TMN-10, 0.4% by weight Fluorad FC-754, 6.0% by weight glycerol, 1600 ppm xanthan gum (with 500 ppm formaldehyde) and water), and for foams including 2% by weight of Tergitol TMN-10 with 0.2, 0.3 or 0.4% by weight of Fluorad FC-754. As shown in FIG. 11, these foams persisted for more than 15 hours and foams made with 0.2% and 0.3% by weight of Fluorad FC-754 and the standard foam had approximately equal stability and foaminess, while foams made with 0.4% by weight of Fluorad FC-754 had reduced stability and foaminess compared to foams made with either 0.2% or 0.3% by weight of Fluorad FC-754 and the standard foam.

Figure 12:
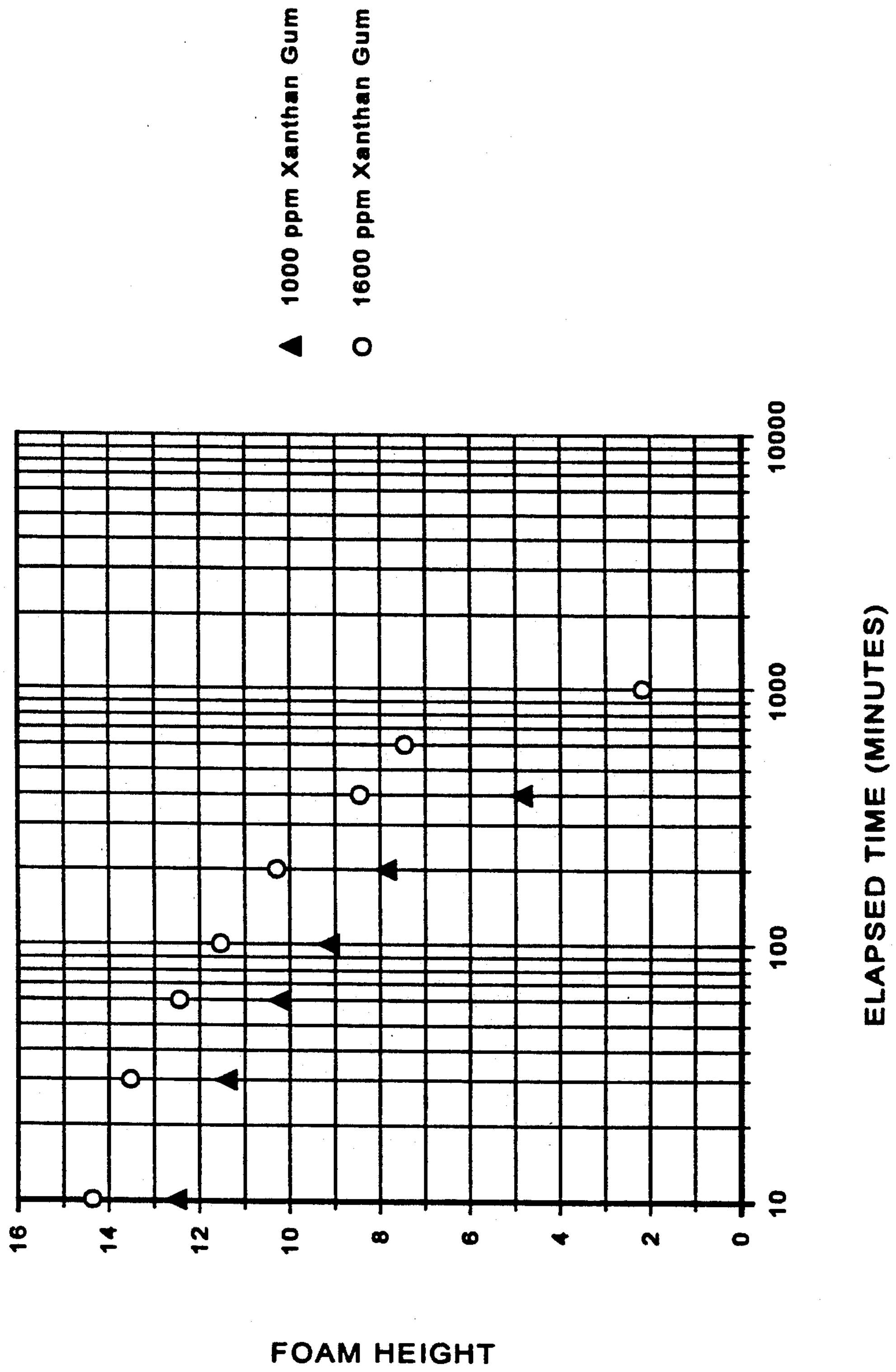
FIG. 12 is a graph showing the foaminess and foam stability of various foam formulations according to the present invention.

FIG. 12 is a graph of foaminess and foam stability for foams including 2% by weight of Tergitol TMN-10 and either 1600 or 1000 ppm xanthan gum. As shown in FIG. 12, these foams persisted for more than 15 hours and had approximately equal stability while foams including 1600 ppm xanthan gum had greater foaminess than foams including 1000 ppm xanthan gum.

EXAMPLE 2

Reduction of Vapor Emission

Figure 13:
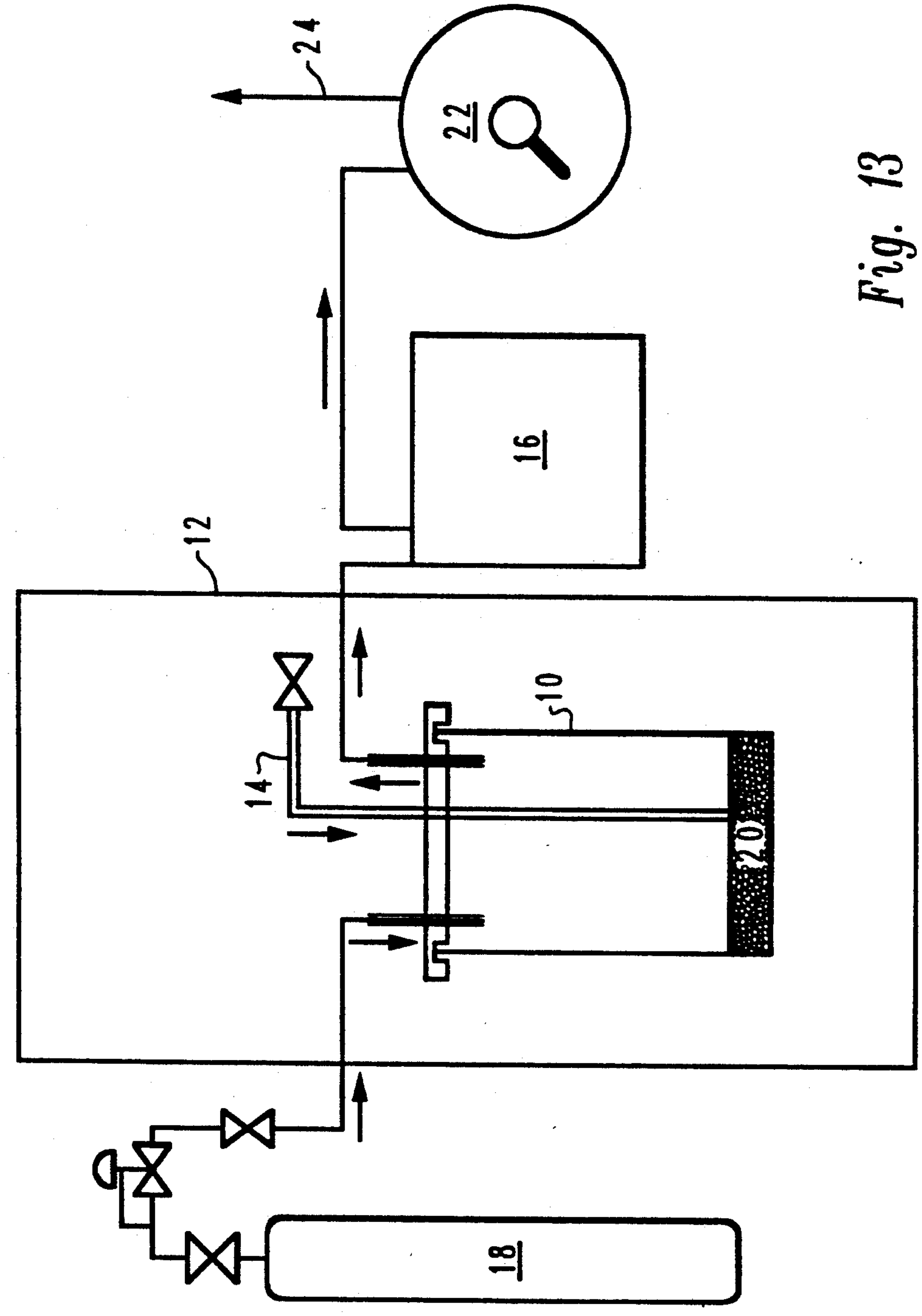
FIG. 13 is a schematic diagram of a vapor emission detection apparatus.

The effectiveness of the foams of the present invention in terms of suppressing hydrocarbon vapors was measured under isothermal and thermal-gradient conditions by loading oil in a vapor emission cell 10 as shown in FIG. 13. The vapor emission cell 10 is disposed with an oven 12 and communicates with an oil inlet 14, a gas chromatograph 16 and a supply of nitrogen gas 18. The gas chromatograph 16 communicates with a wet test meter 22 having a vent 24. Oil 20 may be supplied to the cell 10 and the vapors released from the oil 20 are detected by the gas chromatograph 16.

Isothermal experiments measured the rate of crude oil evaporation, with and without foam, at two temperatures: 74° F. as an optimistic case of high foam stability, and 105° F. as a pessimistic case of low foam stability.

Thermal-gradient experiments were conducted with oil heated to a temperature of 90 and 105° F. so that the oil was at a higher temperature than the head gas above the oil or the foam as the case may be. The oil was added to the cell 10 at a rate of 60 to 200 ml/hour. These experiments created a thermal gradient above the oil layer which is believed to mimic more closely the conditions experienced during tanker loading than an isothermal experiment. The results of the isothermal and thermal gradient experiments are shown in Table 2. In Table 2, a 12-inch layer of foam was applied over the oil unless otherwise specified. The amount of produced hydrocarbon was detected by means of a conventional gas chromatograph.

TABLE 2

SUPPRESSION OF VAPOR RELEASE

| Experiment Type | Produced Hydrocarbon (Grams of HC in 24 hours) No Foam | Foam | Suppression of Hydrocarbon Release wt % |
|---|---|---|---|
| Isothermal | | | |
| 74° F. | 3.02 | 0.16 | 95 |
| 105° F. | 4.41 | 0.57 | 87 |
| Thermal Gradient | | | |
| Fast Loading, 90° F. | 3.77 | 0.18 | 95 |
| 105° F. | 3.97 | 0.64 | 84 |
| 105° F. | | 0.43 | 89 |
| Slow Loading with $N_2$ Sweep | 4.05 | 0.43 | 89 |
| Slow Loading-No $N_2$ Sweep | 2.88 | 0.23 | 92 |
| Slow Loading-No $N_2$-6" Foam | | 0.26 | 91 |

For the isothermal experiments, the amount of hydrocarbon gas produced, without a foam blanket, increased as the temperature increased from 74 to 105° F. For the thermal gradient experiments at 90 and 105° F., a small increase was detected. For either the isothermal or thermal gradient experiments, the foam blanket became increasingly more effective at suppressing vapor release into the atmosphere as the oil temperature was reduced. At the end of 24 hours of the thermal gradient experiments, the total amount of hydrocarbons in the effluent was reduced by at least 84% when oil was loaded in the cell 10 at 105° F., and by as much as 95% when oil was loaded in the cell 10 at a lower temperature of 90° F.

Hydrocarbon Evaporation

Figure 14:
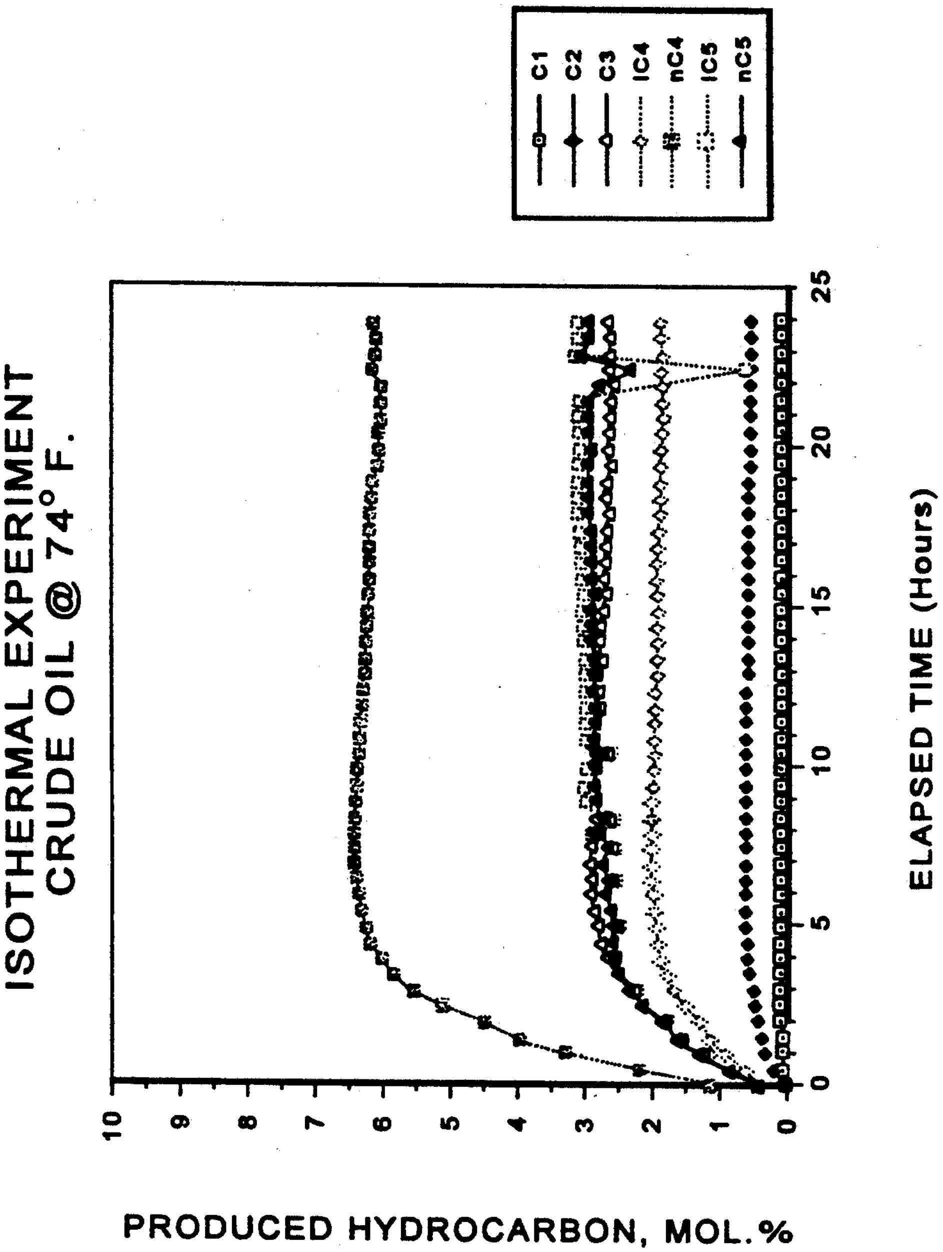
FIG. 14 is a graph of produced hydrocarbon versus elapsed time.
Figure 15:
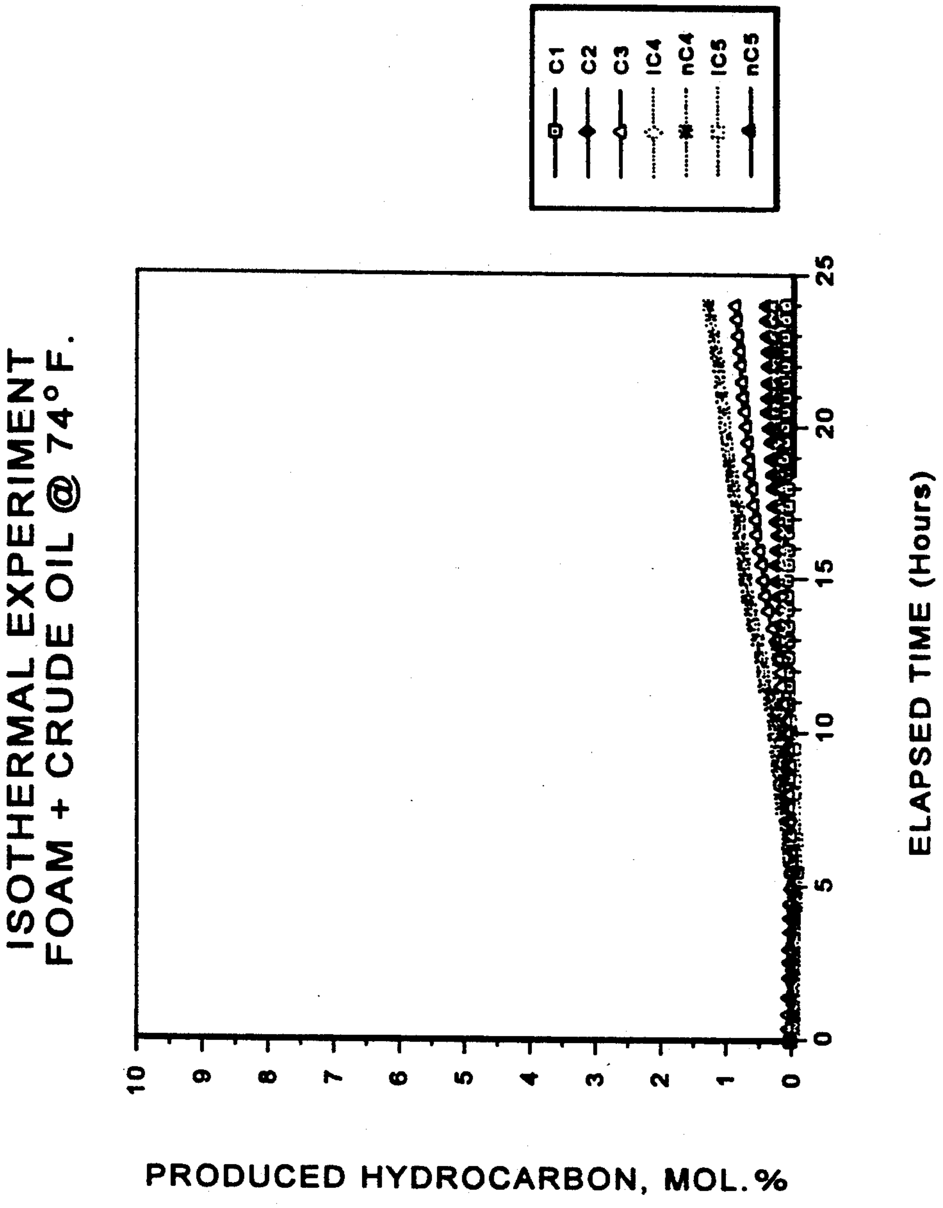
FIG. 15 is a graph of produced hydrocarbon versus elapsed time.
Figure 16:
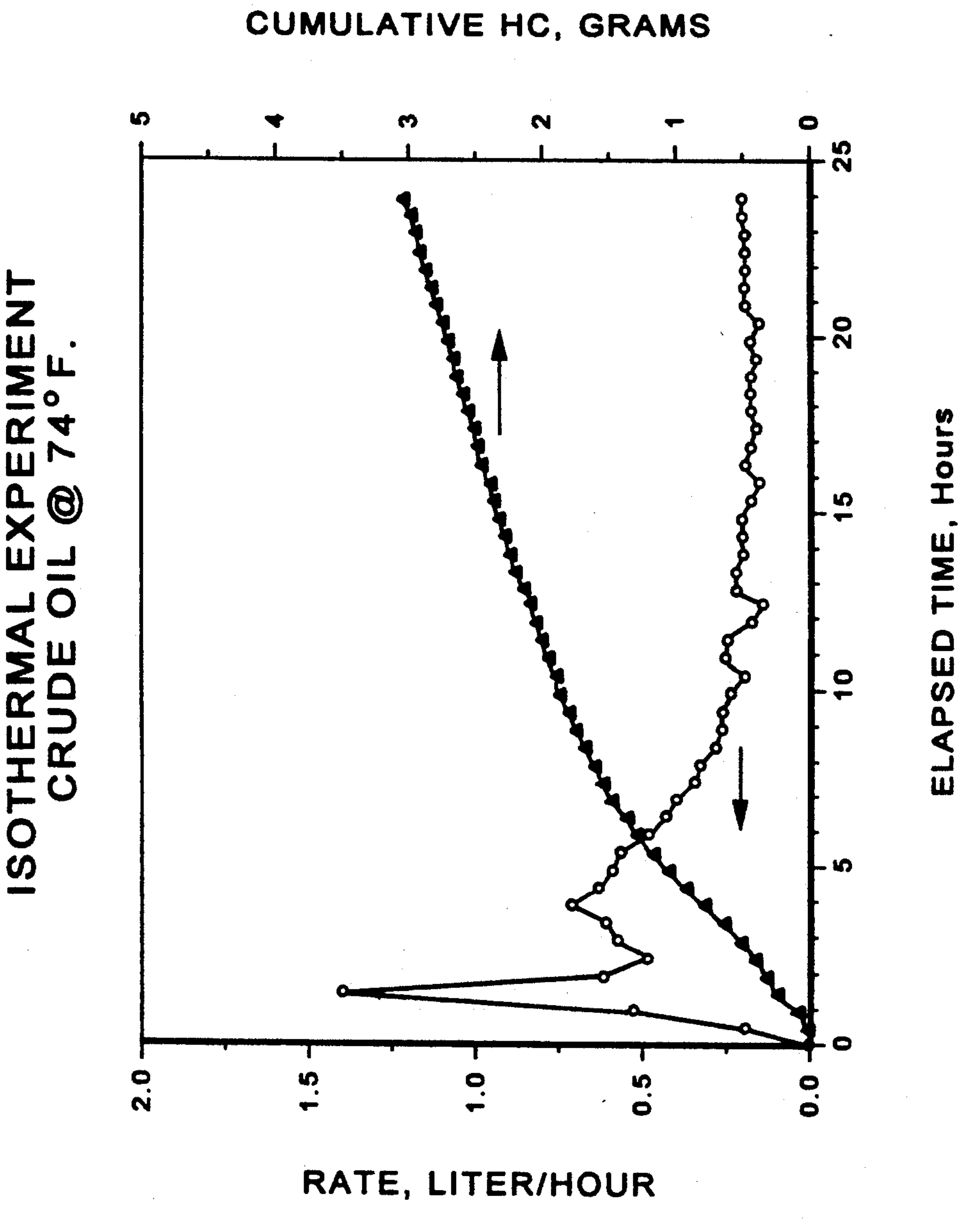
FIG. 16 is a graph of rate of hydrocarbon production versus elapsed time.
Figure 17:
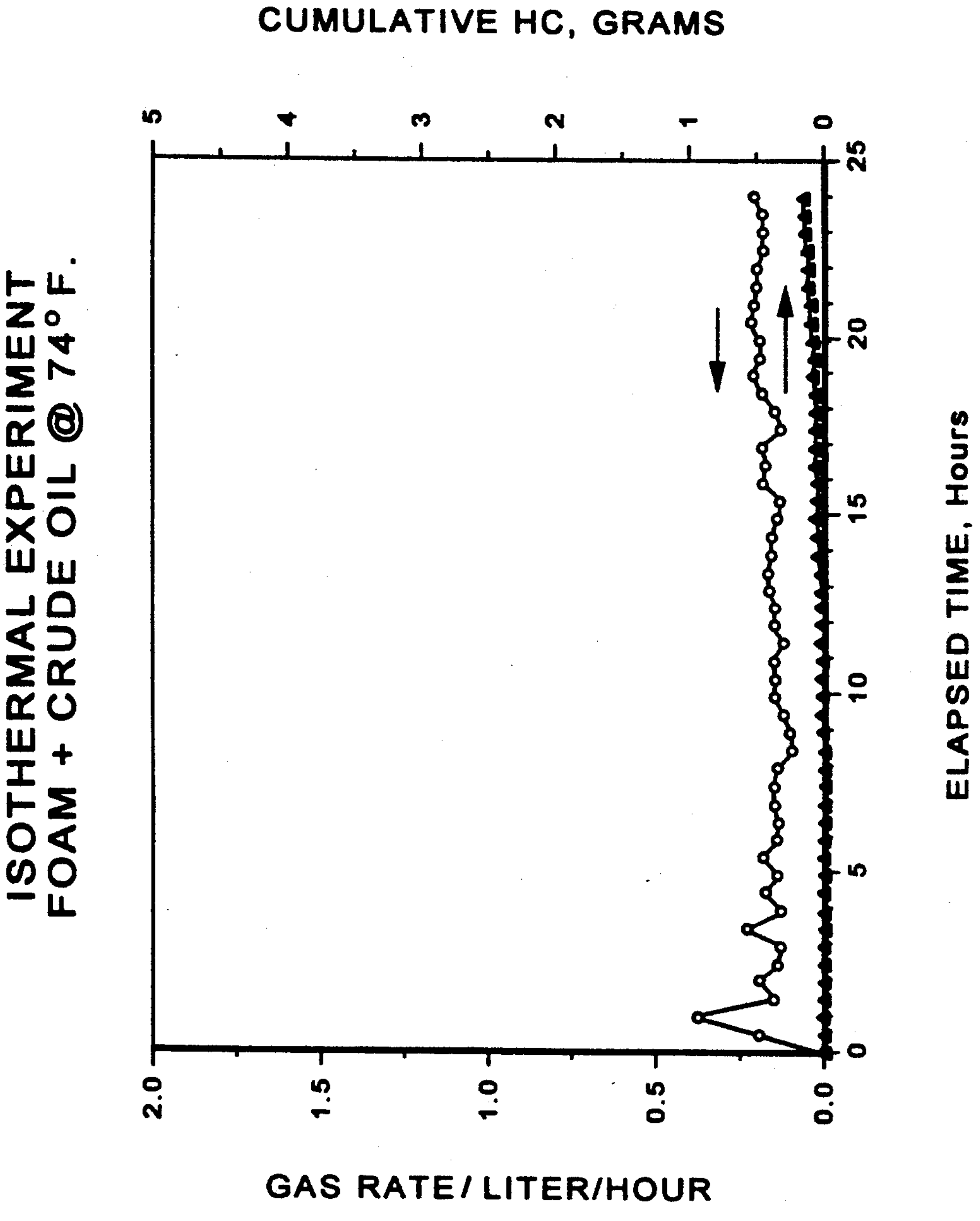
FIG. 17 is a graph of rate of hydrocarbon production versus elapsed time.

FIGS. 14–21 show the concentration of individual hydrocarbons (methane to pentane) as well as the cumulative amount of total hydrocarbons produced in the effluent gas. The total flow rate of produced gas in FIGS. 16 and 17 is a combination of hydrocarbon evaporation rate, nitrogen sweeping rate, and actual rate of introduction of crude oil into the vapor-emission cell 10.

Figure 18:
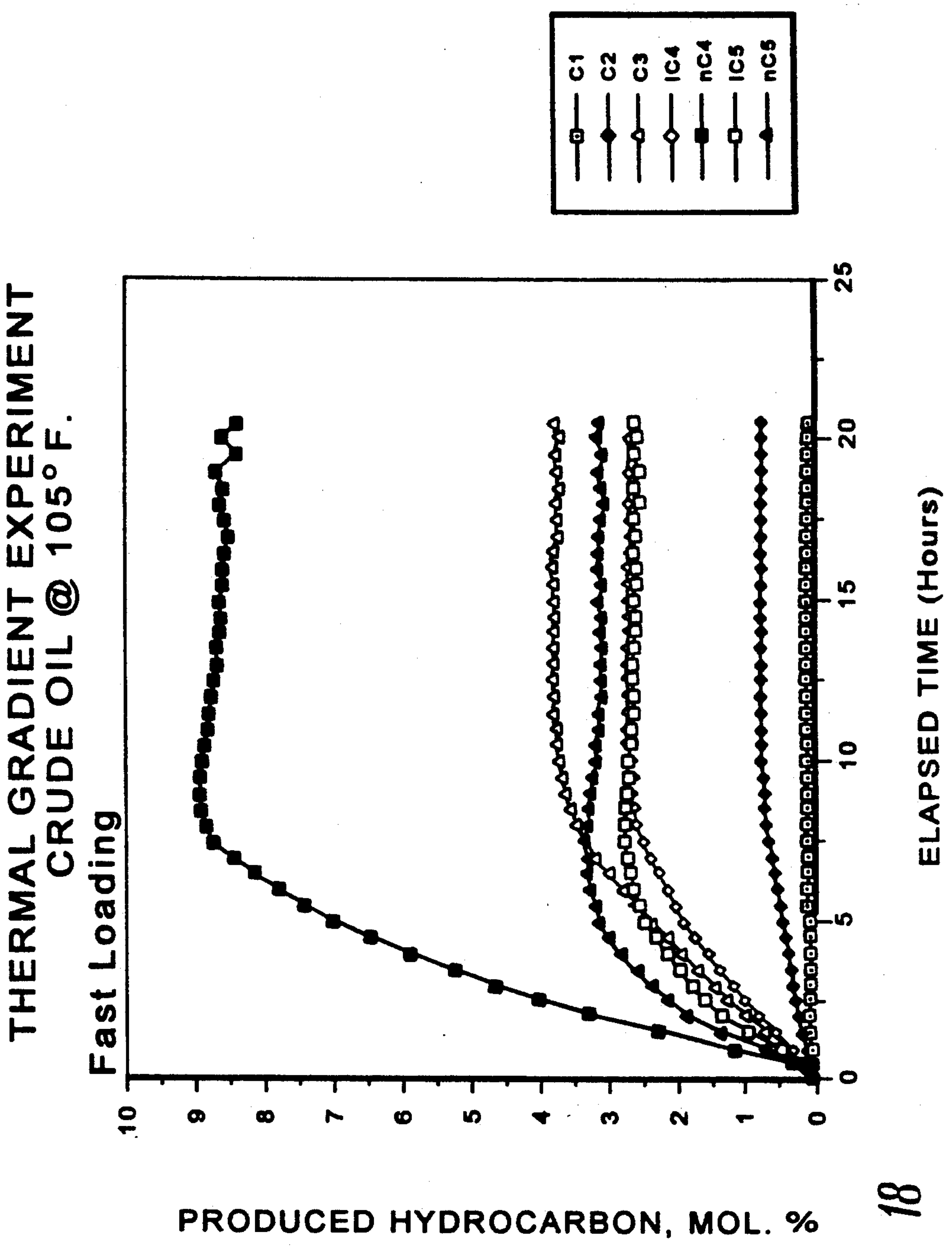
FIG. 18 is a graph of produced hydrocarbon versus elapsed time.
Figure 20:
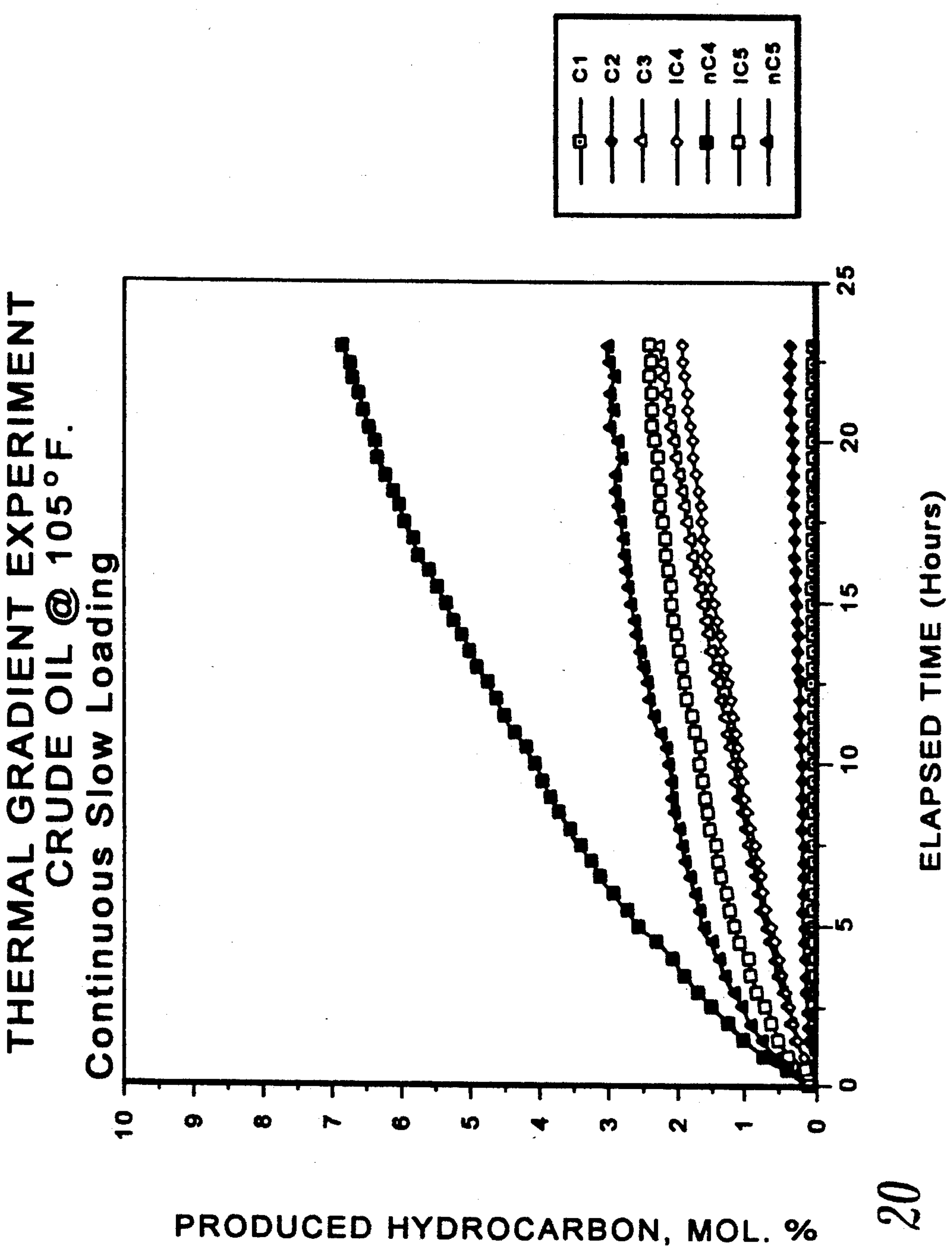
FIG. 20 is a graph of rate of hydrocarbon production versus elapsed time.

As shown in FIGS. 14 and 18, in the case of isothermal or thermal-gradient experiments, the concentration of hydrocarbons in the effluent gas and as shown in FIG. 16, the cumulative hydrocarbon production increased almost linearly with time during oil loading. Shortly after loading (7–8 hours), the concentration of the various gases reached a plateau value, and appeared to decrease slightly with time toward the second half of the experiment. Similarly, the total amount of produced hydrocarbons increased at a slower pace during this period, see FIG. 16. As shown in FIG. 20, in the case of continuous slow loading thermal-gradient experiments, the concentration of the various gases increased almost linearly with time throughout the loading. Thus, the way in which oil was added to the cell (rate and perhaps total amount) strongly affected the results. Moreover, the leveling-off of the hydrocarbon concentrations in these experiments suggested that the sweep of hydrocarbons is faster than their generation in the system with gas diffusion through oil probably constituting the limiting step.

Suppression of Hydrocarbon Release With Foams

Figure 19:
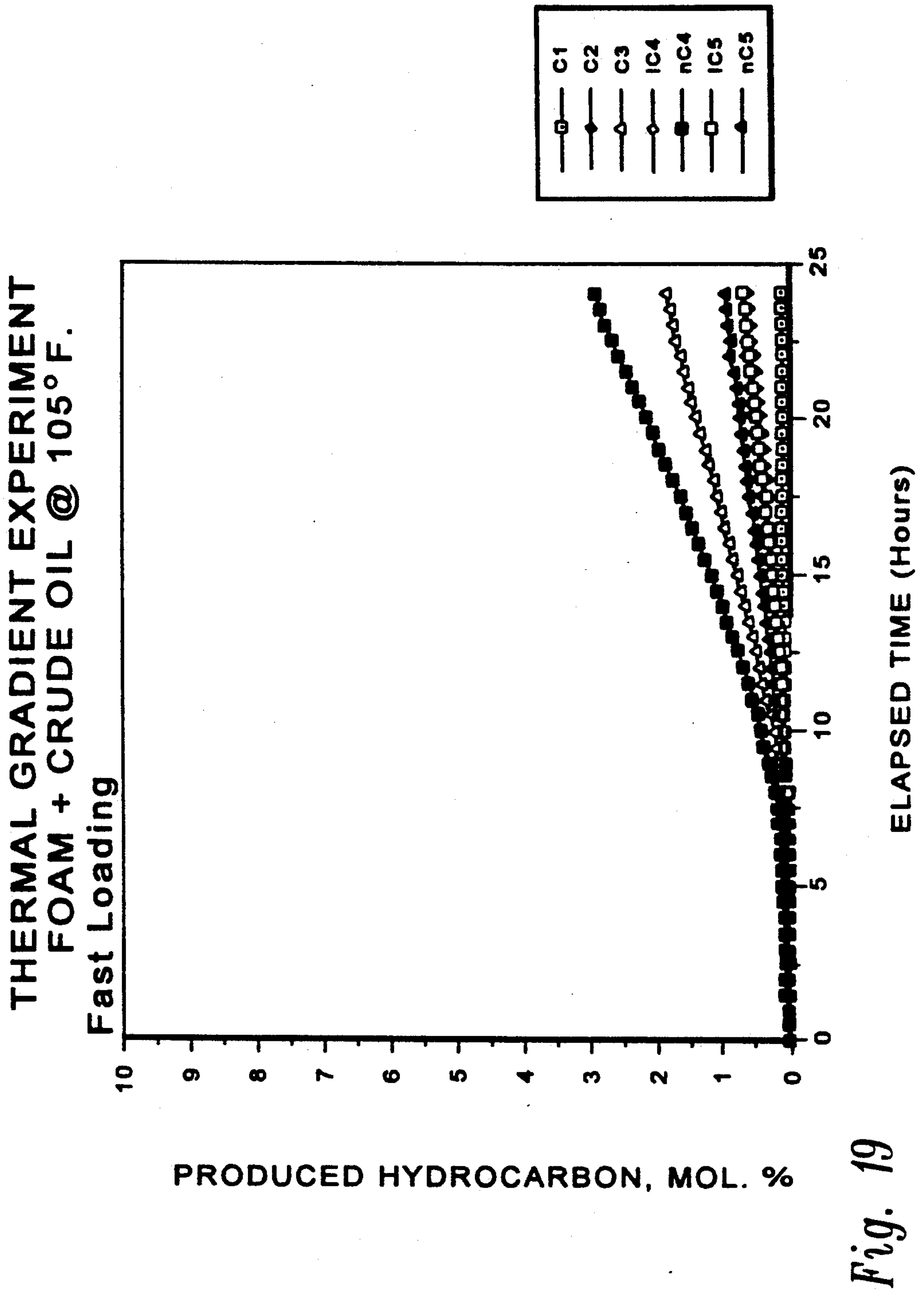
FIG. 19 is a graph of produced hydrocarbon versus elapsed time.
Figure 21:
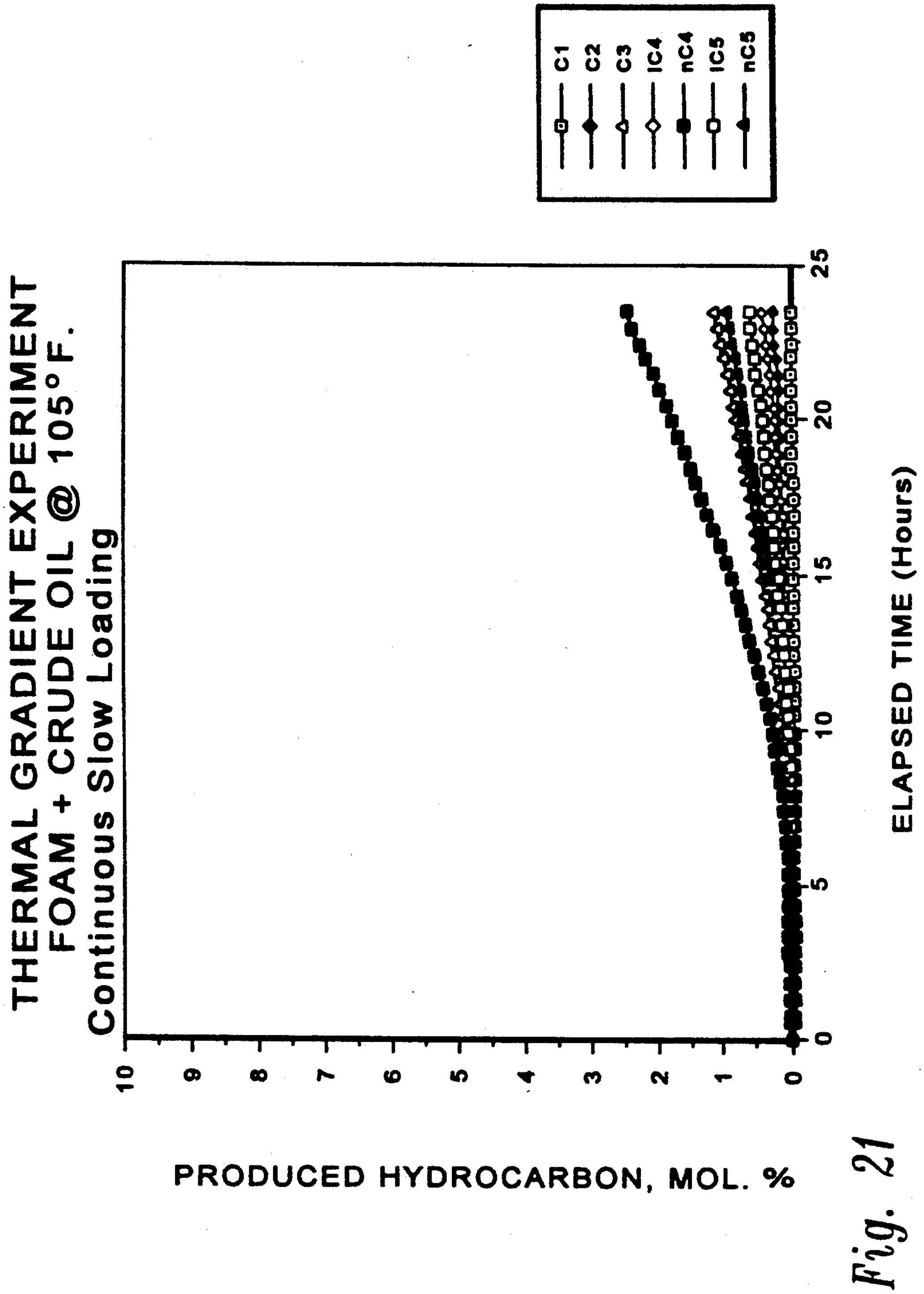
FIG. 21 is a graph of rate of hydrocarbon production versus elapsed time.

As shown in FIGS. 15, 19 and 21, when a blanket of foam according to the present invention is in place, the rate of gas production in the cell 10 was relatively constant, and the concentration of hydrocarbon gases in the effluent increased monotonically and almost linearly. These results indicate that the evaporation of hydrocarbons was primarily limited by their rate of diffusion through the foam, while the amount or rate of oil addition played a secondary role, if any. The hydrocarbon production rate per unit area of foam was expected to be similar in a tanker, given the same oil and gas temperatures. Upon close inspection, the rates of concentration increase and cumulative production of hydrocarbon gases appeared to have two regimes, i.e. an initially slow rate of increase, followed by a much faster rate of increase after about 10 hours, for instance, see FIGS. 15, 19 and 21. This change of hydrocarbon production rate in the presence of foam means that the foam effectiveness over the first 15–16 hours of loading is much higher than the average effectiveness over the entire 24-hour period. The 24-hour suppression varies from about 83% with 105° F. oil to 95% with 90° F. oil. While this suppression factor may change because of a different base case (without foam), the hydrocarbon production rate with foam is expected to be more insensitive to experimental conditions and may be more readily scaled up to tanker size.

Effects of Oil Loading Temperature

The amount of hydrocarbon gas produced without a blanket of foam according to the present invention increased as the temperature increased from 74 to 105° F., in the isothermal cases, see Table 2. In the thermal-gradient cases, however, the amount of produced hydrocarbons appeared to be only slightly higher at 105° F. than at 90° F. The amount of hydrocarbon produced at 105° F. (approximately 0.6 grams) in both isothermal and thermal gradient experiments, is three times higher than the amount of hydrocarbons produced at lower temperatures (approximately 0.2 grams). In all cases, the blanket of foam according to the present invention became increasingly more effective at suppressing vapor release into the atmosphere as the oil temperature was reduced.

Conclusions

It was observed that in all cases—in particular in the thermal gradient case which is closer to an actual tanker loading—the foam of the present invention remained quite stable through the entire experiment. Bubbles in the foam became larger as hydrocarbons diffused through them but remained quite stable, except for a few pre-existing holes that were created when the foam was applied inside the cell 10, which holes grew larger as hydrocarbon evaporation proceeded. This stability is due in part to the inert atmosphere of nitrogen gas inside the vessel. In actual usage, it is anticipated that a less stable foam, such as a less concentrated solution, will be used to insure foam collapse after loading and departure from port. Indeed, as the oil cools, the foam of the present invention can remain stable for several days, and perhaps even for a week at 75.F.

Although preferred embodiments of the present invention have been described in some detail herein, various substitutions and modifications may be made to the compositions of the invention without departing from the scope and spirit of the appended claims.

What is claimed is:

1. A foam solution, comprising:

a) about 0.1 to 6.0% by weight of a water-soluble nonionic surfactant;

b) about 0.01 to 1.0% by weight of a fluorinated co-surfactant;

c) about 1.0 to 10.0% by weight of a polyol stabilizer;

d) about 500 to 5,000 ppm of a viscosifier selected from the group consisting of xanthan gum and welan gum; and e) water;

said foam solution being capable of forming a foam having a persistence of at least 12 hours at temperatures of from 75 to 105° F.

2. A foam solution according to claim 1, wherein said water soluble nonionic surfactant comprises alkyl polyethyleneglycol ether.

3. A foam solution according to claim 2, wherein said alkyl polyethylene glycol ether comprises an alkyl chain comprising from 8 to 16 carbon atoms.

4. A foam solution according to claim 3, wherein said alkyl chain of said alkyl polyethylene glycol ether comprises from 12 to 13 carbon atoms.

5. A foam solution according to claim 2, wherein said alkyl polyethylene glycol ether comprises about 4 to 40 ethylene oxide repeating units.

6. A foam solution according to claim 5, wherein said alkyl polyethylene glycol ether comprises about 10 to 20 ethylene oxide repeating units.

7. A foam solution according to claim 1, wherein said water soluble nonionic surfactant comprises trimethyl nonylpolyethyleneglycol ether.

8. A foam solution according to claim 1, wherein said fluorinated co-surfactant comprises fluorinated quaternary ammonium chloride or fluorinated quaternary ammonium iodide or an alkateric fluorinated surfactant.

9. A foam solution according to claim 1, wherein said polyol stabilizer is selected from the group consisting of glycerol, ethylene glycol, polythylene glycol and combinations thereof.

10. A foam solution according to claim 1, further comprising a biocide.

11. A foam solution according to claim 10, wherein said biocide comprises formaldehyde or glutaraldehyde.

12. A foam solution, according to claim 1, comprising:

a) about 2.0 to 4.0% by weight of said water-soluble nonionic surfactant;

b) about 0.2 to 0.4% by weight of said fluorinated surfactant;

c) about 2.0 to 6.0% by weight of said stabilizer;

d) about 1,000 to 2,500 ppm of said viscosifier; and e) water.

13. A foam solution, according to claim 12, further comprising about 125 to 500 ppm of a biocide.

14. A foam comprising:

from 10 to 1,000 parts of gas to 1 part of dilute foam solution comprising:

a) about 0.1 to 6.0% by weight of a water-soluble nonionic surfactant;

b) about 0.01 to 1.0% by weight of a fluorinated surfactant;

c) about 1.0 to 10.0% by weight of a stabilizer;

d) about 500 to 5,000 ppm of a viscosifier selected from the group consisting of xanthan gum and welan gum; and e) water;

wherein said foam has a persistence of at least 12 hours at temperatures of from 75 to 105° F.

15. A foam according to claim 14 wherein said gas is selected from the group consisting of nitrogen, flue gas and air.

16. A foam according to claim 14 wherein said dilute foam solution comprises:

a) 4.0% by weight of said water-soluble nonionic surfactant;

b) 0.4% by weight of said fluorinated surfactant;

c) 6.0% by weight of glycerol;

d) 1600 ppm of said viscosifier; and e) water;

wherein said foam persists for about 3 to 5 days at a temperature below 90° F. and for about 24 hours at a temperature of 105° F.

* * * * *